(12) United States Patent
Matsumoto et al.

(10) Patent No.: US 8,028,312 B2
(45) Date of Patent: Sep. 27, 2011

(54) INFORMATION PROCESSING APPARATUS AND CONTENT REGISTRATION METHOD, AND PROGRAM

(75) Inventors: Koichi Matsumoto, Tokyo (JP); Kyoko Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 943 days.

(21) Appl. No.: 11/958,599

(22) Filed: Dec. 18, 2007

(65) Prior Publication Data

US 2008/0155626 A1 Jun. 26, 2008

(30) Foreign Application Priority Data

Dec. 21, 2006 (JP) ................................. 2006-343793

(51) Int. Cl.
*H04H 60/33* (2008.01)
*H04N 7/16* (2011.01)
*H04N 7/10* (2006.01)
(52) U.S. Cl. .................. 725/9; 725/25; 725/32; 725/33; 725/34
(58) Field of Classification Search ................ 725/9, 25, 725/32–34
See application file for complete search history.

(56) References Cited

U.S. PATENT DOCUMENTS

2002/0120925 A1* 8/2002 Logan ................................ 725/9

FOREIGN PATENT DOCUMENTS

| JP | 2003331195 A | 11/2003 |
|---|---|---|
| JP | 2004240780 A | 8/2004 |
| JP | 2006325246 A | 11/2006 |

OTHER PUBLICATIONS

Japanese Office Action dated Oct. 28, 2008 for JP Patent Application 2006-343793.
Yoshiyuki Tanaka et al., "Development of Rights Management System for Electronic Dictionaries", Technical Report of Information Processing Society of Japan, Information Processing Society of Japan, Mar. 18, 2006, vol. 2006, No. 31, pp. 17-24.
Japanese Office Action dated Jan. 20, 2009 for JP Patent Application 2006-343793.

* cited by examiner

*Primary Examiner* — Hunter Lonsberry

(57) ABSTRACT

The present invention registers a content so that its composition can be easily recognized, and promotes the reduction of a load in playing processing on the registered content, and improves convenience of users. Also, it evaluates the value of production of a content more properly. An information processing apparatus includes: a generator for generating meta information including content composition information representing a composition of a content to be registered, and mashed-up-or-not information representing whether a content to be registered is a unitary content or a mashed-up content in which a plurality of contents are combined; and a register for registering the generated meta information as content information.

22 Claims, 20 Drawing Sheets

FIG. 11
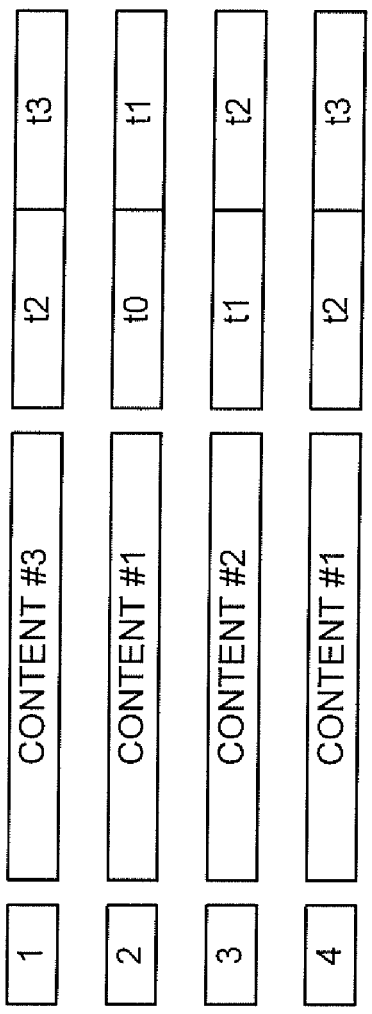
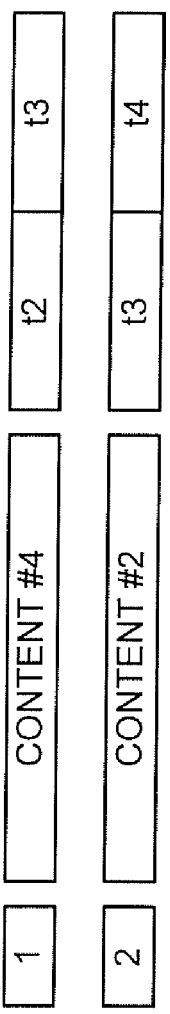

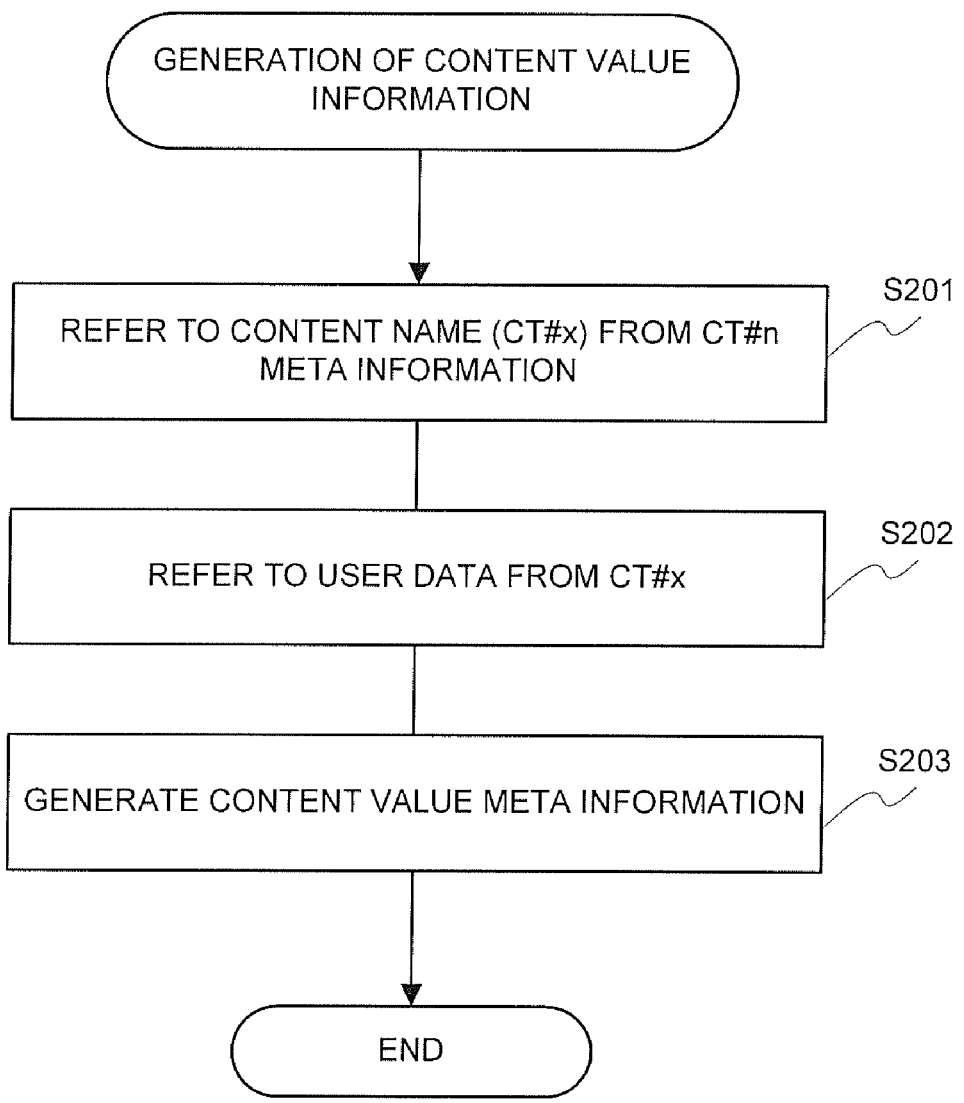

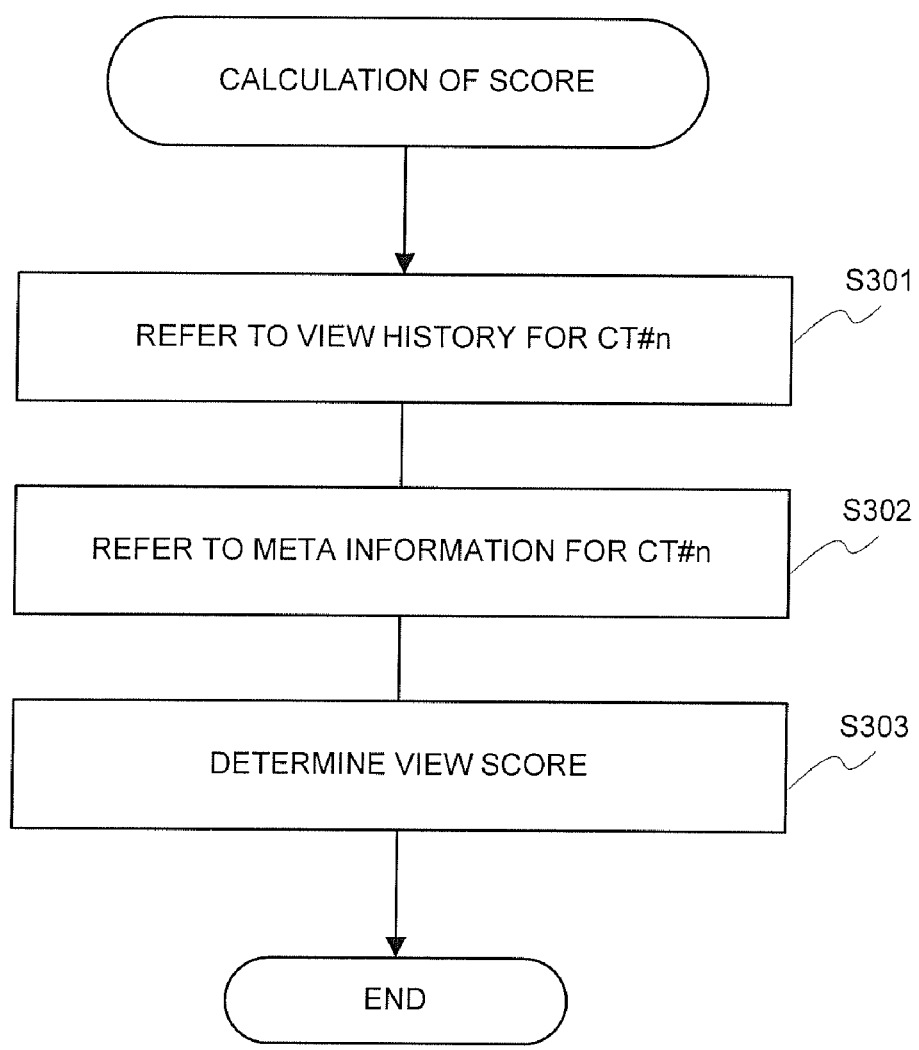

INFORMATION PROCESSING APPARATUS AND CONTENT REGISTRATION METHOD, AND PROGRAM

INCORPORATION BY REFERENCE

This application is based upon and claims the benefit of priority from Japanese patent application No. 2006-343793, filed on Dec. 21, 2006, the disclosure of which is incorporated herein in its entirety by reference.

RELATED ART

The present invention relates to an information processing apparatus, and more particularly, to an information processing apparatus for registering contents such as videos in a distributable manner.

In recent years, CGM (Consumer Generated Media) using the Internet have been widespread, and it has become common practice for an unidentified large number of users to present contents they have on the network. Especially, improvement of processing capability of personal computers and extension of the network band help present videos including moving pictures, in addition to texts and still images in conventional home pages or blogs, on public view in a sharable manner. More recently, attention has been focused on mashing-up (cooperative production) in which an unspecified large number of users individually edit and present such already-presented contents to create new contents.

[Patent Document 1] JP-P2004-240780A

In cooperative production or mashing-up of a content using a network as described above, especially in a cooperative-production/mashing-up and distribution system using video data containing moving pictures, however, operations on the network are difficult. Specifically, editing of a content requires a procedure involving downloading a content from a content distribution system to a client terminal such as a personal computer, performing editing and encoding on it, and then uploading the resulting content again, so that the operation procedure is cumbersome. Moreover, similar video contents containing the same video that is partially reused are accumulated on a public server a number of times, causing a plurality of versions of the same content to be saved.

On the other hand, Patent Document 1 described above discloses a system for generating presentation data directly referring to a plurality of kinds of material data accumulated on a computer in a network.

In performing mashing-up by an unspecified large number of people in a network as described above, however, the material to be referred to may have a hierarchical structure containing a plurality of tiers. When playing a content having such a deeply hierarchical structure, the hierarchical structure must be sequentially referred to during playing processing, thus posing a problem that the playing processing becomes complicated or involves a high load, and hence, lag in play.

Moreover, there is another problem in performing mashing-up that a content produced merely by an editing work such as trimming or coupling without providing any content material is given no value for the editor (editorial value).

SUMMARY OF THE INVENTION

The present invention is made to solve the above-mentioned problems.

It is therefore an object of the present invention to overcome such problems, and particularly, to register a content with an easily recognizable composition for reducing load in playing processing on a registered content, and improving convenience to users. Moreover, it is another object of the present invention to more properly evaluate the value of production of a content.

The above-mentioned objects can be accomplished by an information processing apparatus of an exemplary aspect of the present invention, in which a content is registered. The information processing apparatus is characterized in including: a content accepting section for accepting content identification information for identifying a content to be registered; a content analyzer for analyzing a composition of a content to be registered based on the content identification information; a meta information generator for generating meta information based on a result of the analysis, which includes content composition information representing a composition of a content to be registered, and mashed-up-or-not information representing whether the content to be registered is composed as a unitary content or a mashed-up content in which a plurality of contents are combined; and a meta information register for storing and registering the meta information in a predetermined storage device as content information.

Also, the information processing apparatus in which the content is registered is characterized in including: a section for generating meta information including content composition information representing a composition of a content to be registered, and mashed-up-or-not information representing whether a content to be registered is a unitary content or a mashed-up content in which a plurality of contents are combined; and a section for registering the meta information as content information.

According to the above-described invention, when accepting a content itself or an input of content identification information for designating a content, first the information processing apparatus in which a content such as a video is registered analyzes a composition of the content to be registered based on this information. For example, it analyzes its contents on whether the content to be registered is a unitary content itself or a content in which a plurality of contents are combined, and how each content is combined. And, based on a result of this analysis, it generates meta information including content composition information representing a composition of the content to be registered, and mashed-up-or-not information representing whether the content is a unitary content or a mashed-up content, and registers it as content information. Thereby, in case that the registered content is designated, the information processing apparatus can recognize the composition of the content easily by referring to the meta information of the content, and can execute processing such as playing of the content rapidly and with a low load. Moreover, even in case that this registered content is incorporated into other content, and is utilized as a component content making up a mashed-up content, by referring to the meta information of the component content, production and registration of composition information for a mashed-up content to be newly registered are facilitated, and playing processing or the like of the content can be accelerated.

Also, the meta information generator is characterized in including: a component content identifying unit for identifying a component content making up the content to be registered based on an analysis result of the content to be registered; a meta information reader for reading the meta information of the component content, which is already registered; and a content composition information generator for generating the content composition information of the content to be registered based on the read meta information on the component content, and the analysis result.

And, the above-described content composition information generator is characterized in generating the content composition information of the content to be registered based on the content composition information contained in the meta information of the component content in case that the mashed-up-or-not information contained in the meta information of the component content is information representing a mashed-up content. Specifically, the content composition information generator is characterized in including the content composition information contained in the meta information of the component content in the content composition information contained in the meta information of the content to be registered. And, it is preferable that the content composition information is composed of a combination of unitary contents. Furthermore, it is preferable that the content composition information is composed of information for identifying each unitary content, and information for designating a utilization part of each unitary content.

Moreover, the information processing apparatus is characterized in including: a content distribution request accepting section for accepting a distribution request for a content; and a content distributing section for reading the already registered meta information of a content that is requested for distribution, and performing content distribution processing based on the content composition information contained in the meta information.

By adopting the above configurations, as mentioned above, in case that the content, meta information of which is already registered, is utilized as a component content making up the mashed-up content, and a content to be newly registered is generated as a mashed-up content, even though the component content to be utilized is further a mashed-up content, this can be easily recognized by referring to the mashed-up-or-not information of the meta information of the component content. Also, in case that the component content is a mashed-up content, based on the content composition information of the meta information of the component content, meta information of the content to be registered is generated. For example, content composition information of the component content that is a mashed-up content is included as it is in the content composition information of the content to be registered. Thereby, even in case that the content to be registered utilizes the mashed-up content in a stepwise fashion, content composition information represented so that a unitary content that becomes a material is directly referred to is generated. Accordingly, in playing, the unitary content can be directly called and distributed, and as mentioned above, playing processing or the like of the content can be realized at high speed and with a low load.

Moreover, the information processing apparatus is characterized in including a value information generator for generating and storing value information of the content to be registered and/or each content contained therein based on an analysis result of the content analyzer and/or the meta information.

And, the value information generator is characterized in including: a productive value placing section for, for each content contained in the content to be registered, placing content productive value information representing a value for production of the content; and an editorial value placing section for, in case that the content to be registered and/or the component content making up the content to be registered is the mashed-up content, placing content editorial value information representing a value for mashing-up for the each mashed-up content.

Moreover, it is characterized in that the meta information generator detects an edited point of the content to be registered based on an analysis result of the content analyzer, and stores information of the edited point as editorial information of the content to be registered, and based on the editorial information contained in the meta information of the content to be registered, the editorial value placing section places the content editorial value information, and based on the content composition information contained in the meta information, the productive value placing section places the content productive value information.

And, specifically, in case that the editorial information is contained in the already registered meta information of the component content making up the content to be registered, the editorial value placing section is characterized in including the editorial information in the editorial information of the meta information of the content to be registered.

Moreover, the information processing apparatus is characterized in including a creator information storage for storing content creator information in advance, which identifies a creator of each content, and in that, based on the content creator information, the value information generator provides the value information placed for each content to a creator who created the each content.

Thereby, the productive value is placed for each content making up the content to be registered, and it is evaluated, and also, the editorial value is placed for the edited mashed-up content. For example, in the analysis of the content to be registered, information showing an editorial status for each content is included in the meta information, and based on this, the editorial value information is placed. Accordingly, since the value of creating a content is returned to a user, the creative activity by users can be stimulated, and the frequency of usage of the system can be improved.

Moreover, the above-described value information generator is characterized in providing the value information of a value in accordance with a distribution status of a content by the content distributing section. Furthermore, the value information generator is characterized in providing the value information in accordance with a content part actually distributed by the content distributing section. In this manner, specifically, by evaluating the value in accordance with the distribution status of the content, more proper evaluation according to needs can be done.

Also, in a recording medium of other exemplary aspect of the present invention, in which a program is recorded, it is characterized in that the program causes an information processing apparatus in which a content is registered to execute: a content accepting step of accepting content identification information for identifying a content to be registered; a content analysis step of analyzing a composition of a content to be registered based on the content identification information; a meta information generation step of generating meta information based on a result of the analysis, which includes content composition information representing a composition of a content to be registered, and mashed-up-or-not information representing whether the content to be registered is composed as a unitary content or a mashed-up content in which a plurality of contents are combined; and a meta information registering step of storing and registering the meta information in a predetermined storage device as content information.

Moreover, it is characterized in that the above-described recording medium is a recording medium recording a program that causes an information processing apparatus to execute: a step of generating meta information including content composition information representing a composition of a content to be registered, and mashed-up-or-not information representing whether a content to be registered is a unitary content or a mashed-up content in which a plurality of contents are combined; and a step of registering the meta information as content information.

Furthermore, a method of registering a content in an information processing apparatus, which is other exemplary aspect of the present invention, is characterized in including: a content accepting step of accepting content identification information for identifying a content to be registered; a content analysis step of analyzing a composition of a content to be registered based on the content identification information; a meta information generation step of generating meta information based on a result of the analysis, which includes content composition information representing a composition of a content to be registered, and mashed-up-or-not information representing whether the content to be registered is composed as a unitary content or a mashed-up content in which a plurality of contents are combined; and a meta information registering step of storing and registering the meta information in a predetermined storage device as content information.

Also, a method of registering a content by means of an information processing apparatus is characterized in that the information processing apparatus has: a step of generating meta information including content composition information representing a composition of a content to be registered, and mashed-up-or-not information representing whether a content to be registered is a unitary content or a mashed-up content in which a plurality of contents are combined; and a step of registering the meta information as content information.

Moreover, the above-described meta information generation step is characterized in including: a component content identifying step of identifying a component content making up the content to be registered based on an analysis result of the content to be registered; a meta information reading step of reading the meta information of the component content, which is already registered; and a content composition information generating step of generating the content composition information of the content to be registered based on the read meta information on the component content, and the analysis result.

Furthermore, the method of registering a content is characterized in including, after the above-described meta information generation step, a value information generating step of generating and storing value information of the content to be registered and/or each content contained therein based on an analysis result of the content analysis step and/or the meta information.

Also, the value information generating step is characterized in including: a productive value placing step of, for each content contained in the content to be registered, placing content productive value information representing a value for production of the content; and an editorial value placing step of, in case that the content to be registered and/or the component content making up the content to be registered is the mashed-up content, placing content editorial value information representing a value for mashing-up for the each mashed-up content.

Even for the program and method having the above-described configurations, since they operate as is the case with the above-mentioned information processing apparatus, they can accomplish the above-described objects of the present invention.

BRIEF DESCRIPTION OF THE DRAWINGS

This and other objects, features and advantages of the present invention will become more apparent upon a reading of the following detailed description and drawings, in which:

FIG. 11 shows an exemplary display on a user terminal of part of a viewport;

FIG. 19 is a flow chart showing an operation in generating content value information at the content management server; and FIG. 20 is a flow chart showing an operation in calculating a score at the content management server.

EXEMPLARY EMBODIMENTS

The present invention discloses a content registration system for performing editing, production and registration on a content principally comprised of a video via a network such as the Internet, without downloading existing content data or uploading the result of editing. Moreover, the present invention is characterized in properly evaluating a content to provide feedback to a creator who produced it. Specific configuration and operation of the present invention will be described hereinbelow with reference to embodiments. It should be noted that the content registration system of the present invention is not limited to application to registration of a mashed-up content made up with a plurality of contents or the type of a content is not limited to video.

Exemplary Embodiment 1

Figure 6:
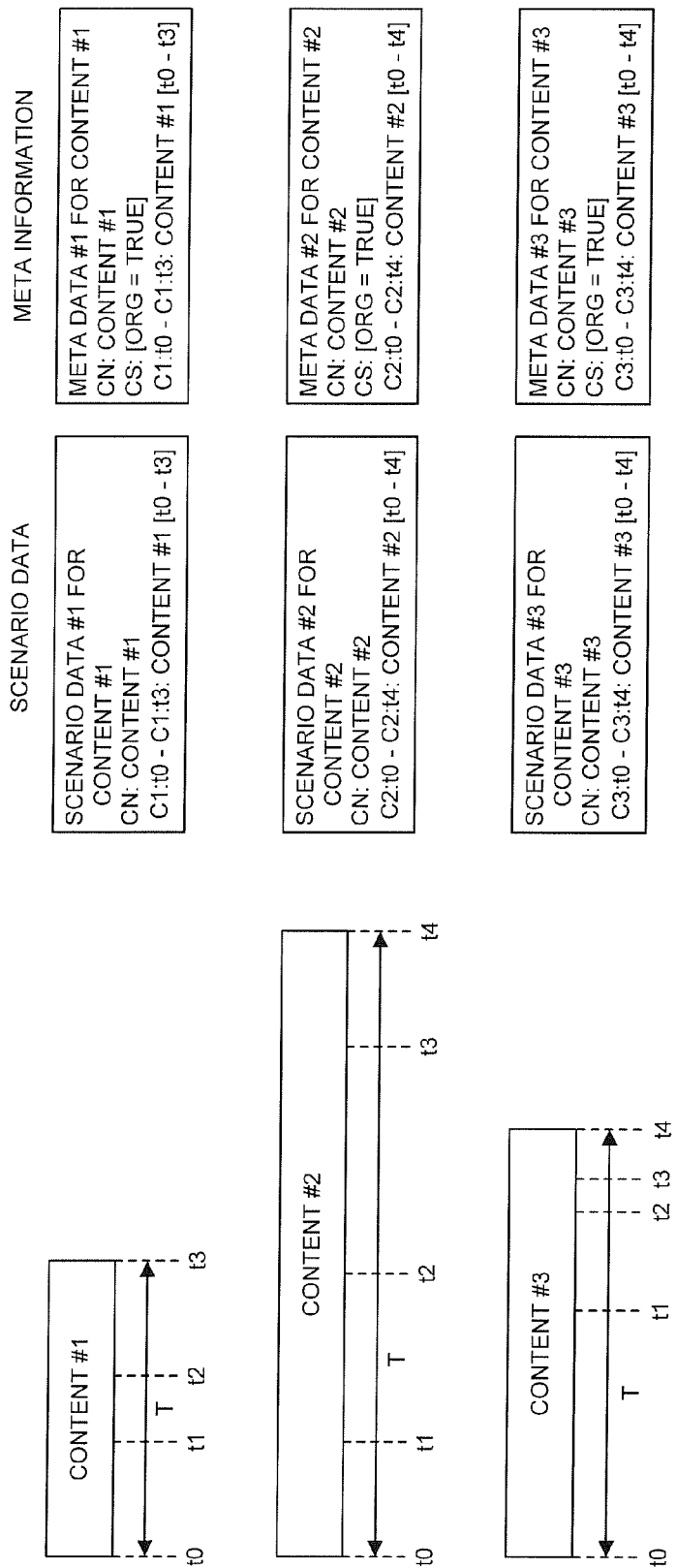
FIG. 6 shows an example of scenario data and meta information for a unitary content.
Figure 7:
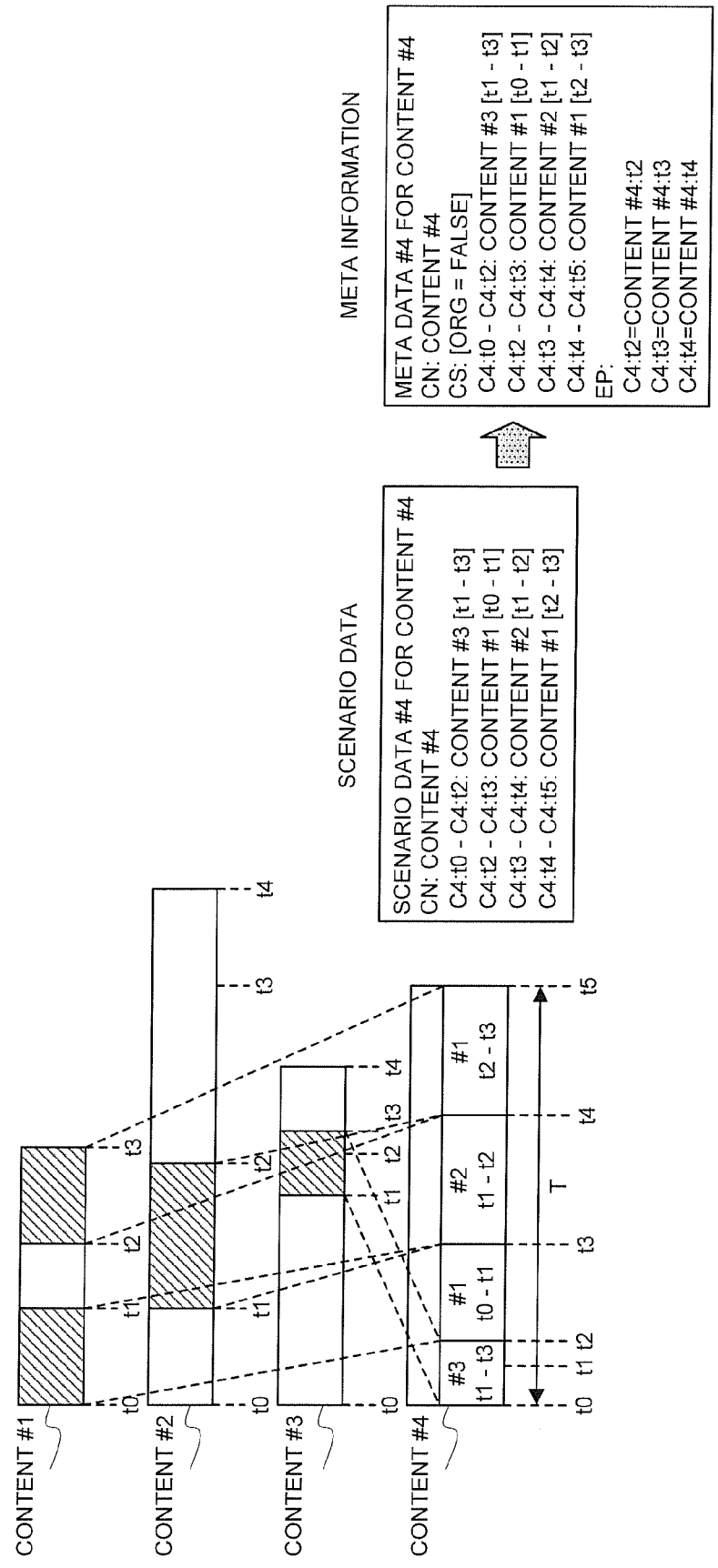
FIG. 7 shows an example of scenario data and meta information for a mashed-up content.
Figure 8:
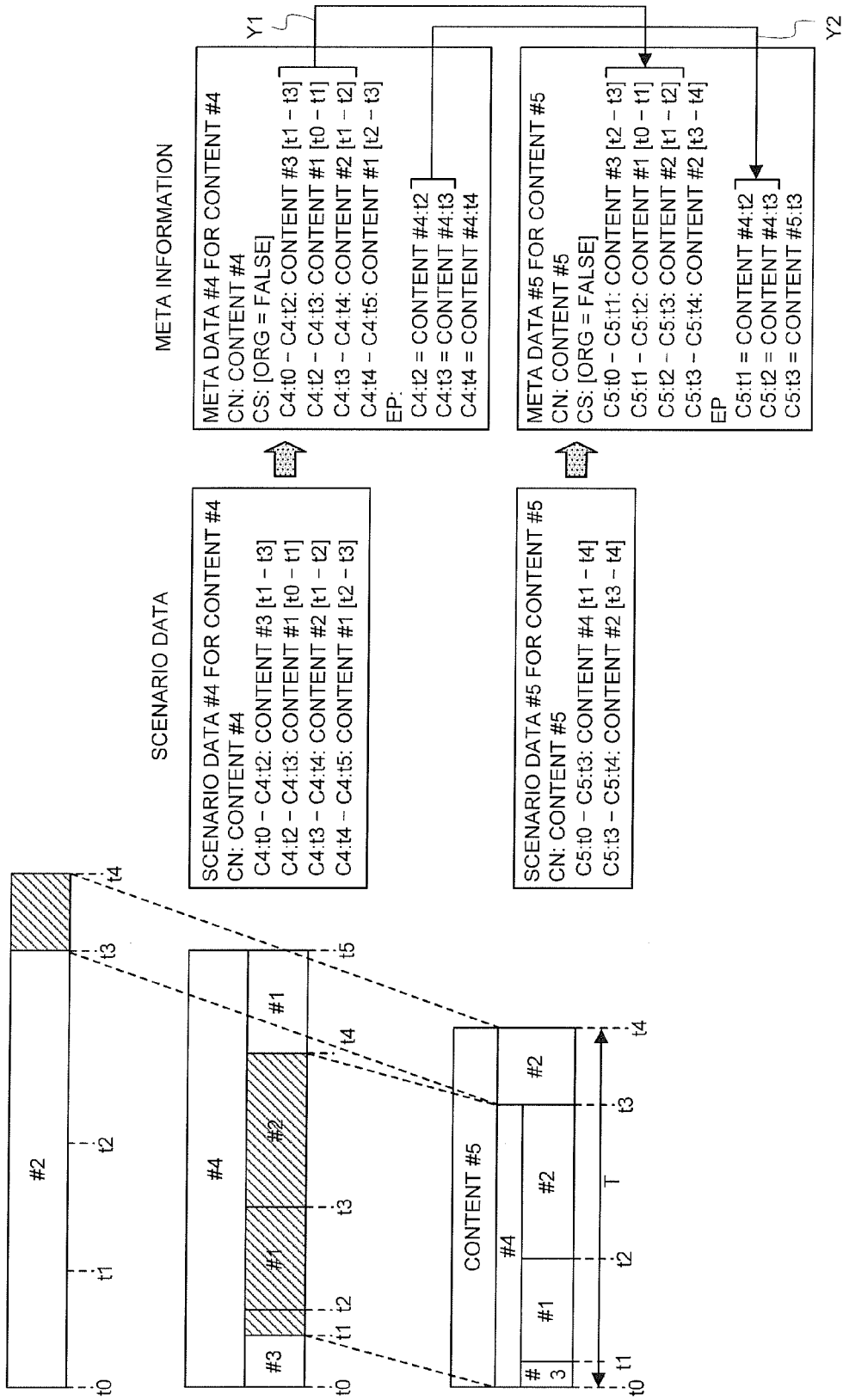
FIG. 8 shows an example of scenario data and meta information for a mashed-up content.
Figure 13:
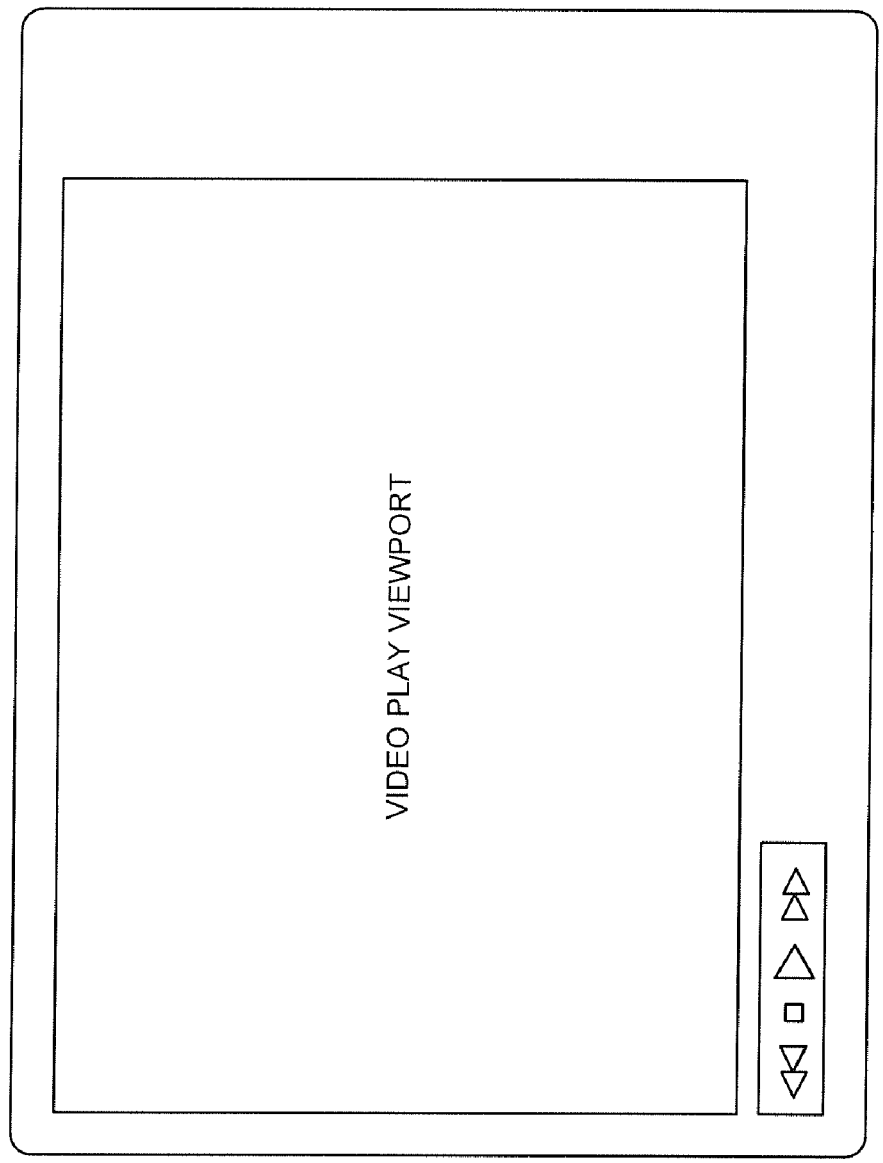
FIG. 13 shows an exemplary display on a user terminal in browsing a content.
Figure 14:
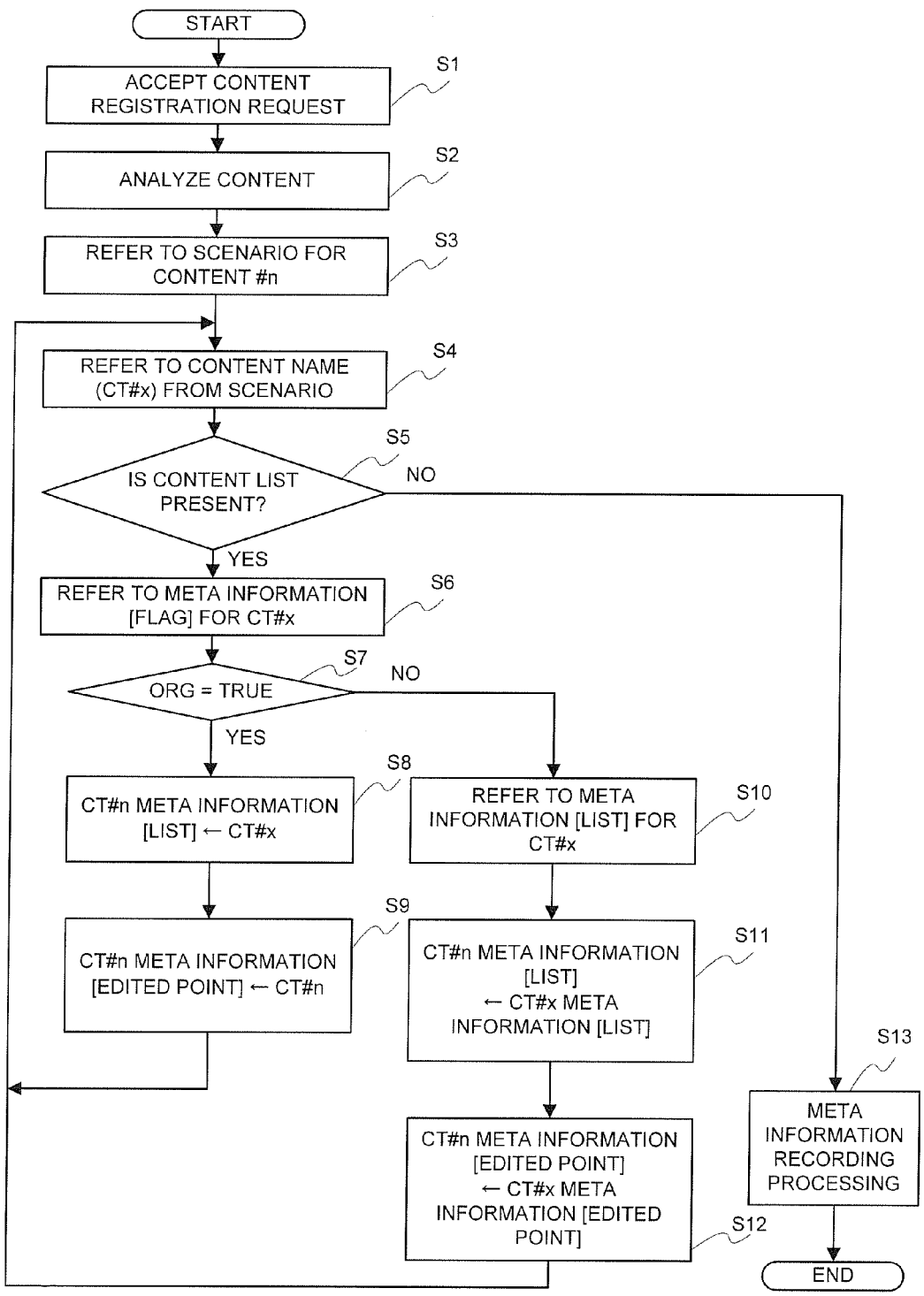
FIG. 14 is a flow chart showing an operation in generating meta information at the content management server.

Now a first embodiment of the present invention will be described with reference to FIGS. 1-14. FIGS. 1-5 show a configuration of a system and computer in the present invention. FIGS. 6-8 show processing in registering a content. FIGS. 9-13 show a viewport displayed on a user terminal. FIG. 14 shows an operation.

[Configuration]

Figure 1:
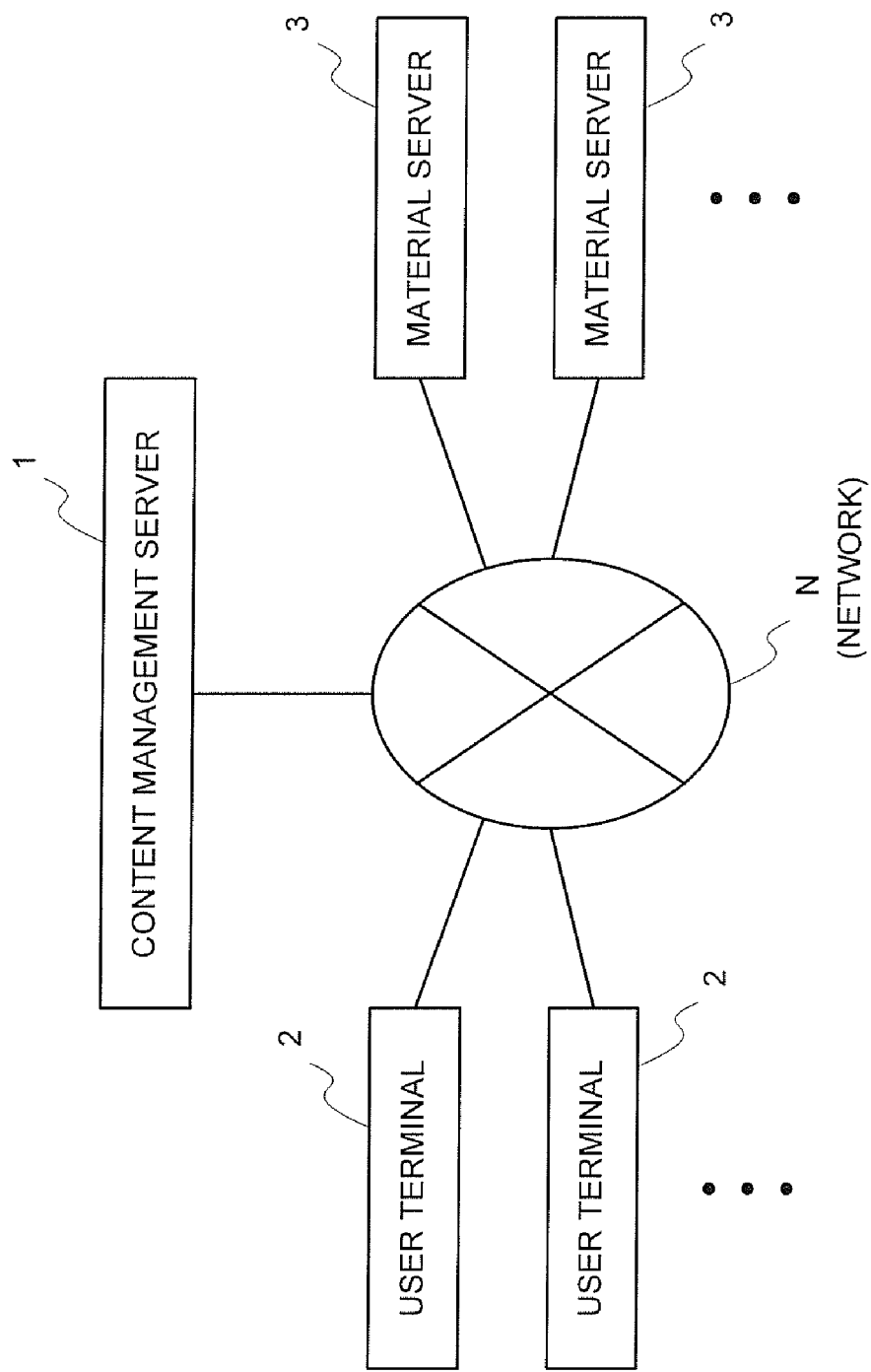
FIG. 1 is a block diagram showing the overall configuration of a content registration system.

First, as shown in FIG. 1, a content registration system in the present embodiment has a content management server 1 for performing registration and distribution of contents, a user terminal 2 for performing production and registration of a content and receiving distribution of a registered content, and a material server 3 in which other contents are registered and distributed, all connected via a network N such as the Internet. The components will be described in detail hereinbelow.

Figure 2:
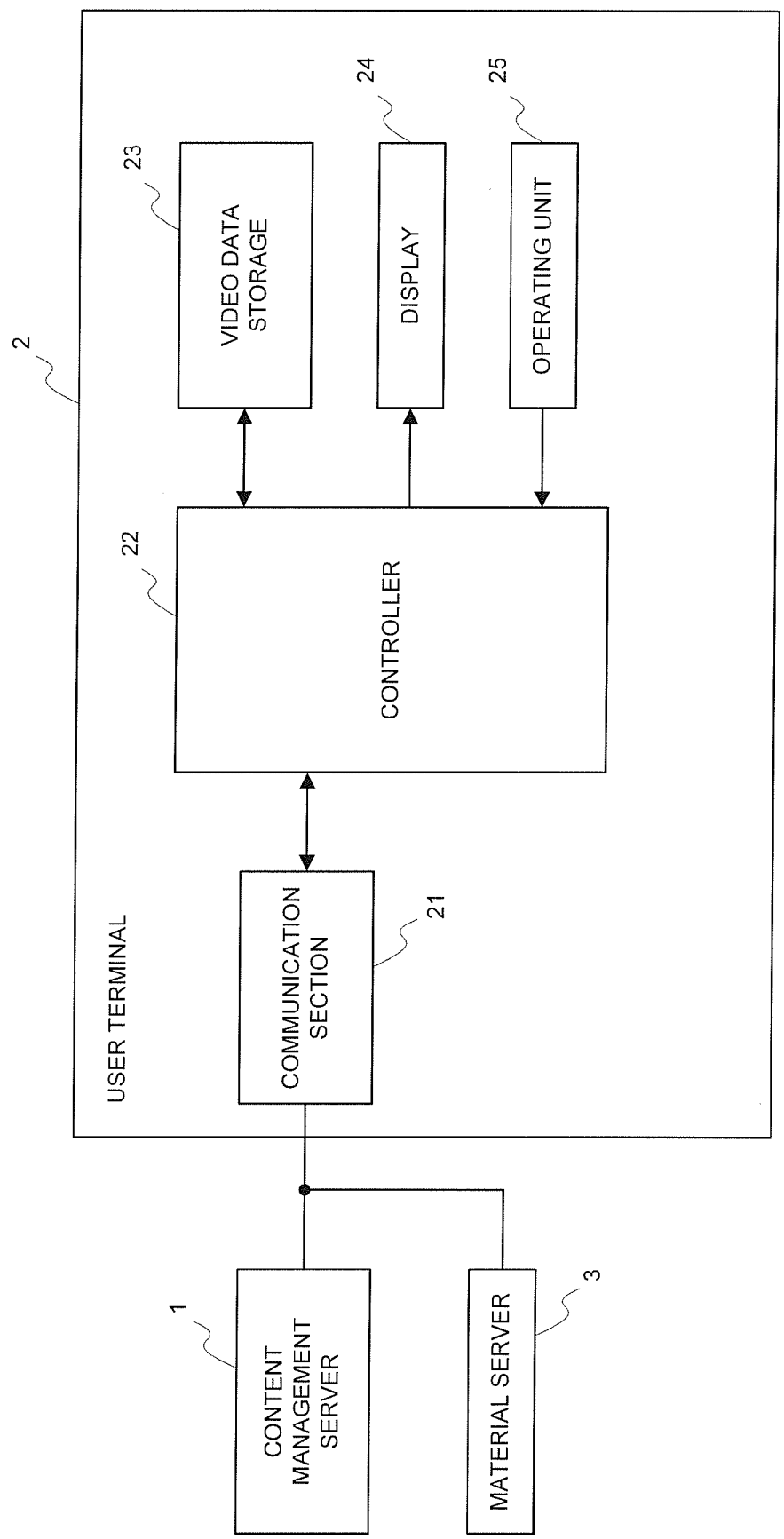
FIG. 2 is a block diagram showing a configuration of a user terminal.

The user terminal 2 is an information processing terminal operated by a user for watching a content, and for inputting an operation of registration/editing of a content, such as a personal computer, PDA, and a cell phone. The user terminal 2 comprises a communication section 21, a controller 22, a video data storage 23, a display 24, and an operating unit 25, as shown in FIG. 2. The communication section 21 communicatively connects to the content management server 1 or the like. The controller 22 controls the operation of the terminal itself. The video data storage 23 stores video data itself (a unitary content) produced or owned by a user and encoded in an MPEG or Windows Media format or the like. The display 24 displays a watch-content viewport and an editorial operation viewport. The operating unit 25 is used by the user for inputting an operation in watching or editing.

The user terminal 2 accesses the content management server 1 in response to an operation by the user, which will be discussed later, to register video data itself at the content management server 1, or register a content at the content management server 1 after editing/producing it using other video data registered in the content management server 1, material server 3 or the like. Moreover, the user terminal 2 is used to watch video data registered in the content management server 1. Details of specific processing will be particularly described later in explaining the operation.

Figure 3:
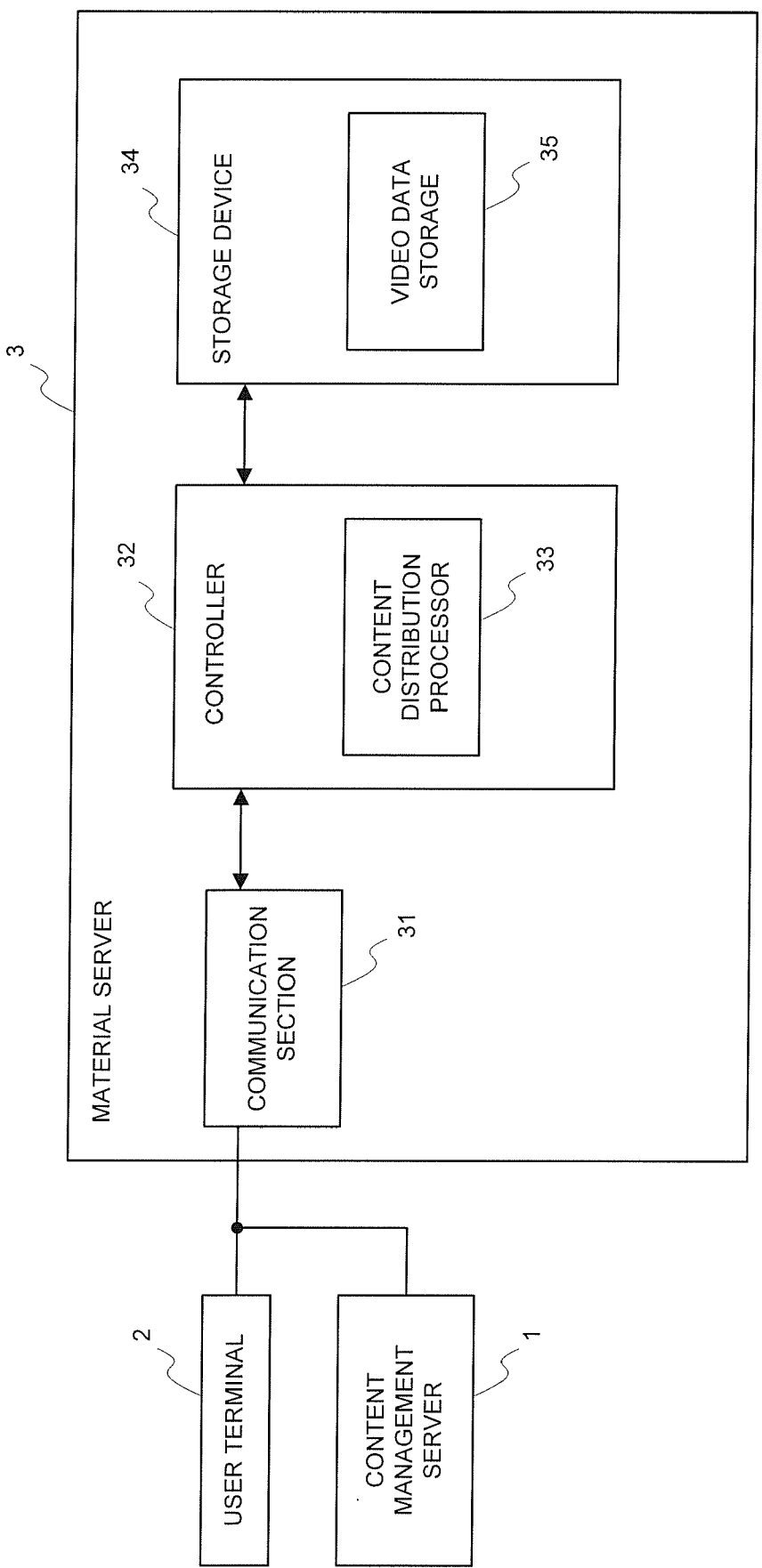
FIG. 3 is a block diagram showing a configuration of a material server.

The material server 3 is a server computer accumulating and distributing video data registered by the user terminal 2, etc. The material server 3 comprises a communication section 31 for connection with the content registration system or the like, a controller 32 for controlling the operation of the server, and a storage device 34 for storing information, as shown in FIG. 3. Especially, in the storage device 34, a video data storage 35 is formed for storing video data registered by the user terminal 2 or the like, and in the controller 32, a content distribution processor 33 is built for distributing video data in response to a request thereof by the content management server 1 or user terminal 2. Details of specific processing will be particularly described later in explaining the operation.

Figure 4:
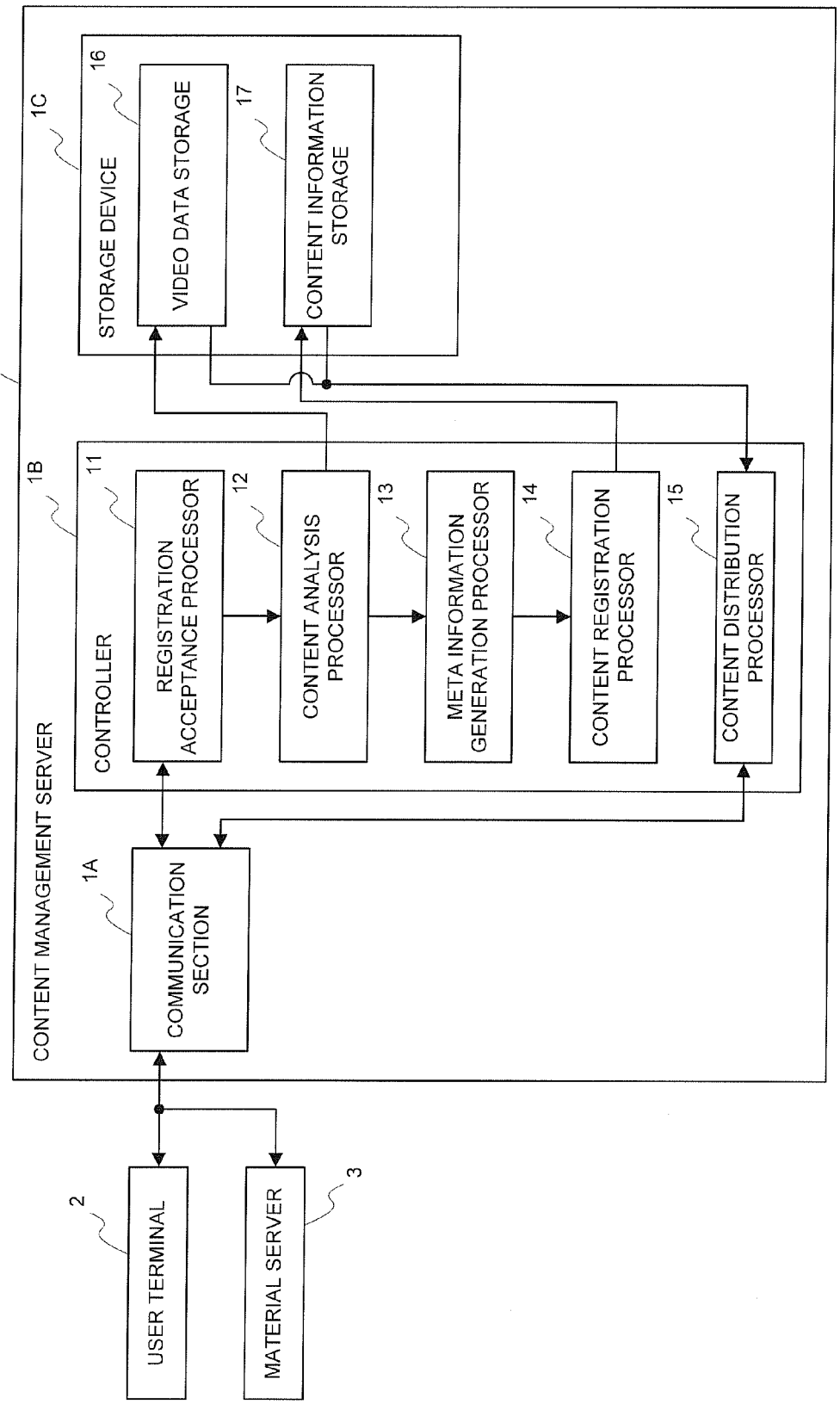
FIG. 4 is a block diagram showing a configuration of a content management server.

Next, a configuration of the content management server 1 (information processing apparatus) will be described with reference to FIGS. 4 and 5. The content management server 1 is a common server computer for registration and distribution of contents, and as shown in FIG. 4, it comprises a communication section 1A for communication with the client terminal 2 and material server 3, a controller 1B such as a CPU for controlling the operation of the server itself, and a storage device 1C such as a hard disk for storing information.

In the controller 1B, a given program is incorporated to build a registration acceptance processor 11, a content analysis processor 12, a meta information generation processor 13, a content registration processor 14, and a content distribution processor 15. In the storage device 1C, a video data storage 16 and a content information storage 17 are formed. These processors 11-15 and storages 16, 17 will be described in more detail hereinbelow.

The registration acceptance processor 11 (content accepting means) accepts a command for registration of video data (a content to be registered) from the user terminal 2. Particularly, the registration acceptance processor 11 comprises a new registration processor 111 and an editorial registration processor 112 as shown in FIG. 5, and the editorial registration processor 112 in turn comprises a content searching section 113, a content selector 114, a composition modifying section 115, and a content register 116. It should be noted that these sections 112-116 are implemented by incorporating a given program into the controller 1B as above.

Figure 9:
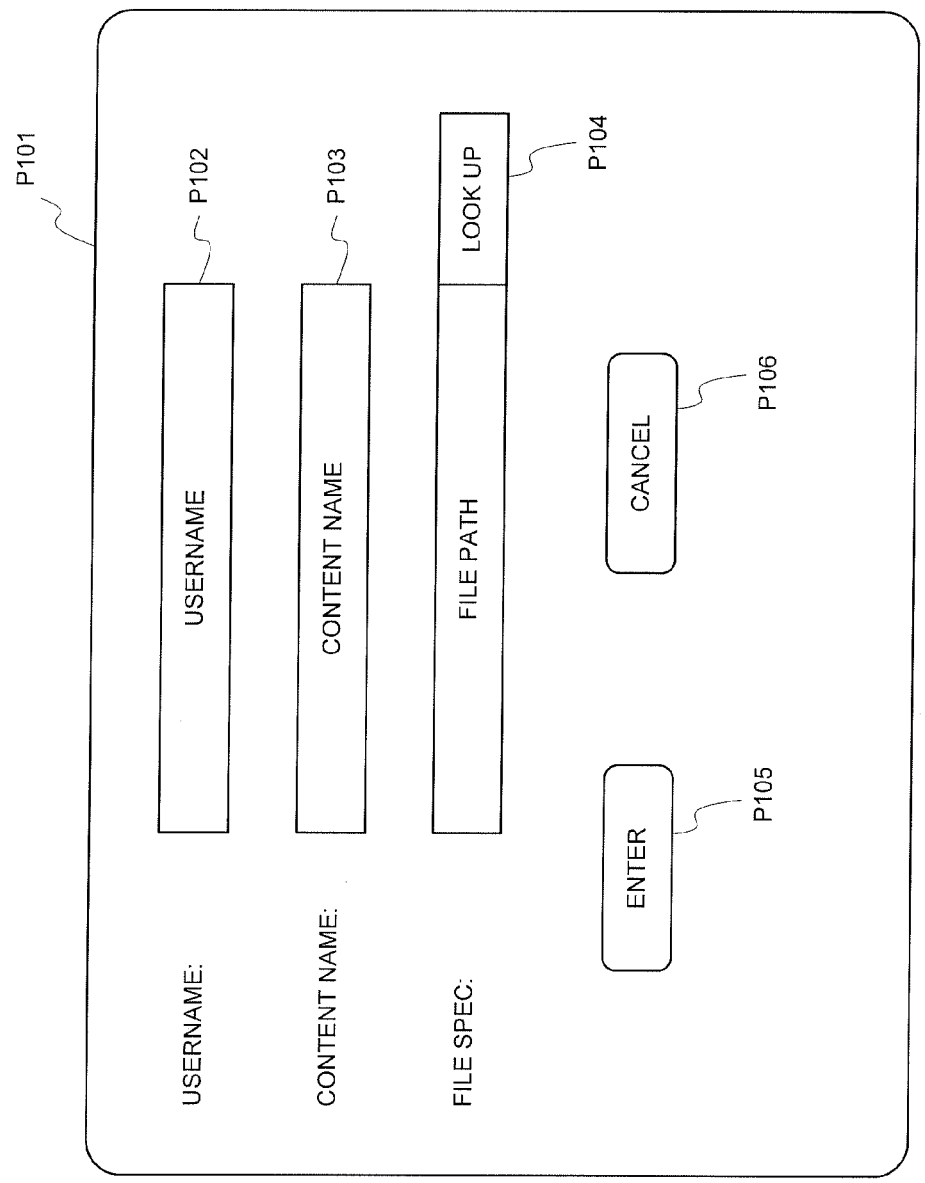
FIG. 9 shows an exemplary display on a user terminal in registering a unitary content.

The new registration processor 111 accepts new registration of video data (a unitary content) from the user terminal 2. For example, it transmits a video registration viewport P101 as shown in FIG. 9 to the user terminal 2, and accepts from the user terminal 2 a username P102, a content name P103, and a file path P104 for identifying video data, input via the viewport P101. That is, it accepts information (content identification information) for identifying video data to be registered, and passes it to the content analysis processor 12. It should be noted that the new registration processor 111 is activated when one attempts to register video data itself, i.e., data comprising a unitary content in one video file, as indicated by contents #1, #2, #3 in FIG. 6.

Figure 10:
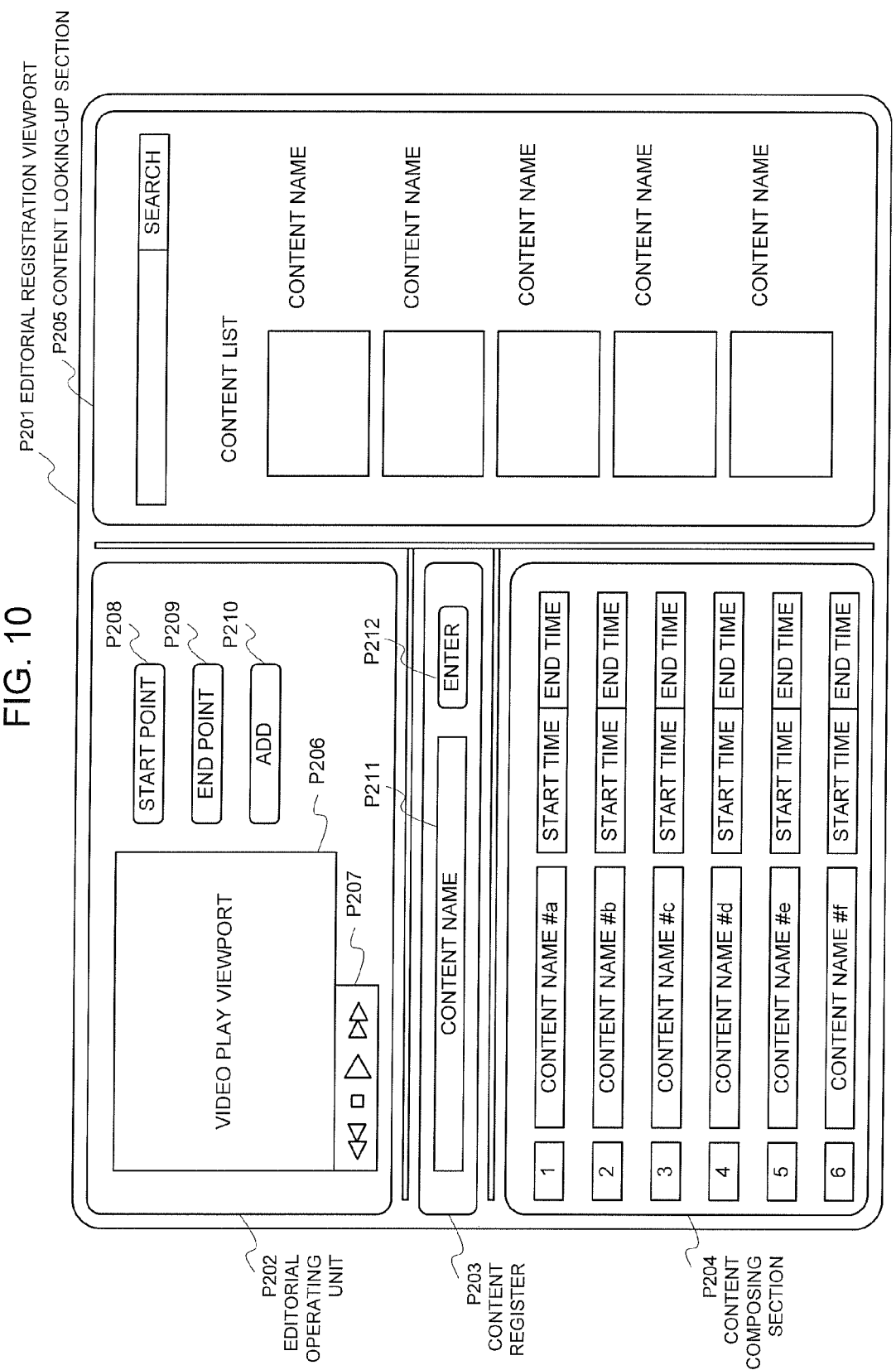
FIG. 10 shows an exemplary display on a user terminal in editing/registering a mashed-up content.

The editorial registration processor 112 accepts a production/editing command and a registration command for mashed-up video data (a mashed-up content) created by combining a plurality of sets of video data, from the user terminal 2. For example, it transmits an editorial registration viewport P201 as shown in FIG. 10 to the user terminal 2, accepts a production/editing command input via such a viewport to transmit video data or the like to be edited to the user terminal 2, and accepts content identification information for identifying a mashed-up content and representing a composition of the edited mashed-up content.

Particularly, the editorial registration viewport P201 is comprised of an editorial operating unit P202, a content register P203, a content composing section P204, and a content looking-up section P205. In the content looking-up section P205, the aforementioned content searching section 113 (content searching means) is activated to thereby search a content, which is video data already registered at the content management server 1 or material server 3, and display a list of contents resulting from the search, based on a search condition input to a search field.

In the editorial operating unit P202, the content selector 114 (content reproducing/outputting means, content selecting means, composition information generating means) is activated, whereby upon input of information designating a content such as by selecting the name of a content displayed in the content looking-up section P205 (designating information inputting section), the designated content is played on a video play viewport P206 (reproducing operating unit). At that time, replay, stop, fast forward, and rewind of a content are enabled via an operation on a video operating button P207 (reproducing operating unit).

The user presses a start-point button P208 and an end-point button P209 (selecting information inputting section) specifying a portion to be used (a content portion) during play of the designated content, and then presses an add button P210.

A portion from a position played at the press of the start-point button P208 (start-point specifying section (specifying section)) to a position played at the press of the end-point button P209 (end-point specifying section (specifying section)) is identified as a component content portion that is to be added to a mashed-up content.

The selected content is then added to the content composing section P204 (composition display section), and the content name, and start and stop times in terms of a relative time from the content start-point of the selected video are displayed as composition information for the mashed-up content. By repeating the operation at the aforementioned editorial operating unit P202, a plurality of contents can be combined.

Although the preceding description exemplarily addresses a method of selecting a certain portion of a content to be incorporated into a mashed-up content that comprises pressing the start-point button P208 and end-point button P209 (portion selecting operating unit (selecting information inputting section)) during play of the content to input information on the selected portion, the present invention is not limited to selection of a content portion via such an operation, and any method of selecting a content portion may be employed. For example, a configuration in which a content portion played while pressing a given button is selected may be contemplated, or a user watching the content being played may directly input a play time of the content.

Moreover, the composition information displayed in the content composing section P204 may be easily modified in the sequence of the contents or the like, by a user operating on the viewport in the content composing section P204 to input a composition modifying command. For example, the content index number displayed on the content composing section P204 may be dragged to and dropped at an arbitrary position, so that the contents are reordered in a dropped sequence. Furthermore, it is possible to delete a content by selecting it and inputting a deleting command, or add a content to the content composing section P204 by dragging and dropping the name of a content from the content list. In addition, selection or modification of a portion to be used of the selected content may be achieved by directly inputting the start and stop times. It should be noted that the aforementioned composition modifying function may be implemented by the operation of the composition modifying section 115 (composition modifying means).

Upon completion of the editorial operation, the content name P211 to be registered is input at the content register P203, and an ENTER button P212 (registration operating unit) is then pressed, whereupon the specification in the content composing section P204 is accepted to the content management server 1 as content identification information, and then passed to the content analysis processor 12 for registration as an edited content. An example in which an already-registered content is edited to create a new mashed-up content is shown by the content #4 in FIG. 7 and content #5 in FIG. 8. Moreover, FIG. 11 shows a conceptual diagram displayed in the content composing section P204 on the editorial registration viewport P201 in FIG. 10 in editing/registering the contents #4 and #5.

The editorial registration viewport P201 as described above allows the user to play a content for use as a component in creating a mashed-up content, and hence, edit the content while recognizing its details, thus enabling easy production as desired by the user. Moreover, selection of a content portion is enabled by selecting start-point and end-point buttons, thus facilitating the operation and improving operability for the user. Furthermore, composition can be modified by inputting a composition modifying command for a mashed-up content on the displayed composition information, thus facilitating editing of a mashed-up content and further improving operability for the user.

The content analysis processor 12 (content analyzing means) in the content management server 1 analyzes video data transmitted from the user terminal 2, i.e., a unitary content registered from the video registration viewport P101 shown in FIG. 9, and a scenario representing the composition of the mashed-up content mashed up at and transmitted from the editorial registration viewport P201 shown in FIG. 10 to generate scenario data for the contents #1-#5 as exemplarily shown in FIGS. 6, 7 and 8.

Particularly, scenario data for the content #1 shown in FIG. 6 indicates that the content name is content #1, and the content #1 consists of an elementary content from a start time C1:t0 (=0) to an end time C1:t3 (relative time). Scenario data for the content #4 shown in FIG. 7 indicates that the content #4 is created by combining content portions corresponding to time t1-t3 of the content #3, t0-t1 of the content #1, t1-t2 of the content #2, and t2-t3 of the content #1. Scenario data for the content #5 indicates that the content #5 is created by combining content portions corresponding to t1-t4 of the content #4, and t3-t4 of the content #2. When video data is directly registered as with the contents #1-#3, the video data itself is associated with the content name and recorded in the video data storage 16.

The meta information generation processor 13 (meta information generating means) in the content management server 1 generates meta information to be registered as content information based on the result of the aforementioned analysis, i.e., on the scenario data of the content to be registered. The meta information mainly contains a content name, a content list (content composition information) representing the composition of the content, flag information (mashed-up-or-not information) representing whether the content is composed as a unitary content or a mashed-up content comprising a combination of a plurality of contents, and an edited point (editorial information) indicating an edited position. Particularly, with regard to the content #1 shown in FIG. 6, it can be seen that the content #1 is made up as a unitary content from its scenario data, and therefore, its meta information indicates that the content name is content #1, ORG flag information is TRUE, which indicates that the content is original data, and the content #1 consists of an elementary content from a start time C1:t0 (=0) to an end time C1:t3 (relative time).

In order to accommodate a case in which a mashed-up content is to be registered, the meta information generation processor 13 further comprises a component content identifying unit (not shown: component content identifying means) for identifying a component content making up the content based on the aforementioned scenario data, meta information reader (not shown: meta information reading means) for reading already-registered meta information for each component content, and a content composition information generator (not shown: content composition information generating means) for generating a content list (content composition information) for the content to be registered based on the read meta information on the component content, and the result of the analysis.

Now a case in which meta information for the content #4 shown in FIG. 7 is generated will be exemplarily described.

First, the composition of the content #4 is identified from its scenario data, which shows that the content #4 is made up with the content #3, content #1, content #2, and content #1. Then, meta information for the component contents #1-#3 are read to check ORG flag information, and it turns out that they are all TRUE, indicating that each is a unitary content, and refers to video data itself, as shown in FIG. 6; thus, their content names, start times and end times are registered in a content list, and edited points C4t2-C4t4 are registered as the time of the content #4.

With regard to the content #5 shown in FIG. 8, it is made up with the contents #4 and #2, wherein the content #4 has ORG flag information of FALSE in meta information #4 indicating that the content #4 is an editorial content, and thus, start and end times of the content #4 that the content #5 refers to are used to calculate corresponding times, and the content list for the meta information #4 in a portion between the corresponding times is registered (see arrow Y1 in FIG. 8).

Moreover, for the edited points, C5:t1 and C5:t2 corresponding to the time at which the content #4 is referred to are registered as edited points in the content #4, and C5:t3 is registered as an edited point in the content #5 (see arrow Y2 in FIG. 8).

Thus, the meta information generation processor 13 generates meta information by, when a component content (content #4 in the present example) making up the content to be registered (content #5 in the present example) is a mashed-up content, incorporating all or part of the content list, which is contained in the meta information of the component content (#4), into the content list for the content to be registered (#5).

By generating meta information as described above, the content list in meta information for a content is comprised of a combination of unitary contents having video data registered. In particular, the list is comprised of the content names for identifying the individual unitary contents, and time information for identifying a portion in each content that is used.

The content registration processor 14 (meta information registering means) in the content management server 1 registers the meta information generated as described above at the content information storage 17 as content information.

The content distribution processor 15 in the content management server 1 comprises a content distribution request accepting section (not shown: content distribution request accepting means) for accepting a distribution request for a content, and a content distributing section (content distributing means) for reading already-registered meta information in a content that is requested for distribution, and performing content distribution processing based on the content list contained in that meta information.

Figure 12:
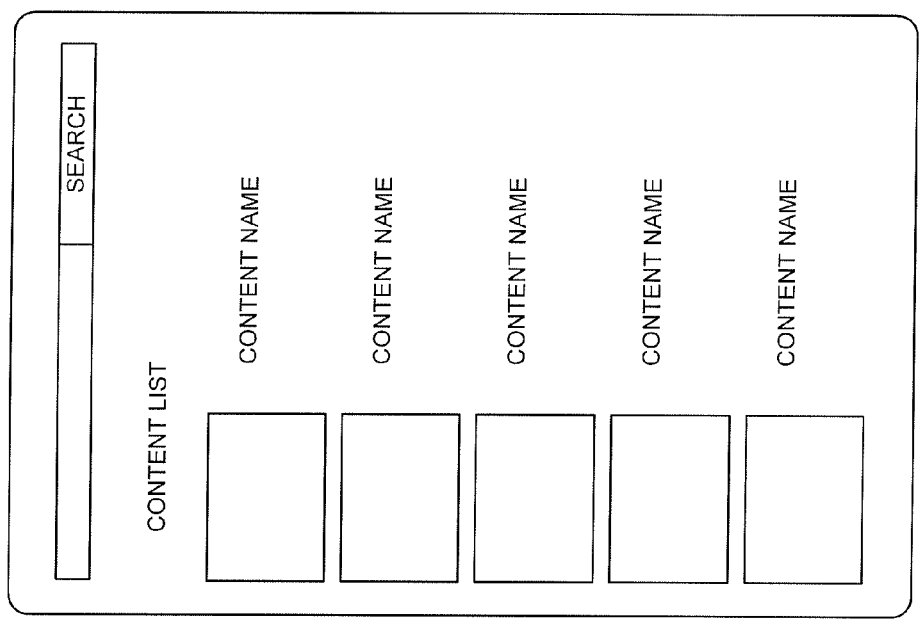
FIG. 12 shows an exemplary display on a user terminal in browsing contents.

In particular, upon a request of content watching by the user terminal 2, a viewport for displaying a list of contents distributable from the content management server 1, as shown in FIG. 12, is transmitted to the user terminal 2. The user terminal 2 then selects a content that the user wants to watch from the content list, whereby the user's request is transmitted to the content management server 1.

The content management server 1 reads meta information for the selected content from the content information storage 17, and performs streaming distribution of video data registered in the content list in its meta information. For example, video data stored in the video data storage 16 is distributed, or a distribution command is sent to a material server 3 when the video data is stored in the material server 3. The user terminal 2 receives distributed streaming data, and displays a play viewport as shown in FIG. 8 on its display. At that time, processing such as replay, stop, fast forward, and rewind are enabled.

[Operation]

Next, an operation of the content registration system having the aforementioned configuration, mainly, that of the content management server 1 will be described with reference to a flow chart in FIG. 14 and other drawings.

First, the user terminal 2 specifies an IP address or a URL in the network N, and connects to the content management server 1. In response to the connection request by the user terminal 2, the registration acceptance processor 11 in the content management server 1 transmits a video registration processing viewport P101 shown in FIG. 9.

The user terminal 2 displays the received video registration processing viewport P101 on the display 24. The user inputs on the video registration processing viewport P101 a username in a username input field P102 and a name of a content to be registered in a content name input field P103, and designates video data to be registered in a file specification P104, and then presses an ENTER button P105. Triggered by the press of the ENTER button P105, the username input to the username input field P102, the content name input to the content name input field P103, and the video data designated in the file specifying field P104 are transmitted to the content management server 1.

The registration acceptance processor 11 in the content management server 1 accepts the aforementioned information (Step S1, content accepting step), and passes them to the content analysis processor 12. The content analysis processor 12 then analyzes the received information to generate scenario data (Step S2, content analyzing step), and it is recorded with the associated video data and content name in the video data storage 16.

The content analysis processor 12 also passes the aforementioned scenario data to the meta information generation processor 13. The meta information generation processor 13 generates meta information based on scenario data (Steps S3 and S4, meta information generating step), and records them in the content information storage 17 (Step S13, content registering step after NO at Step S5).

Referring to FIG. 6, a conceptual diagram is shown illustrating a concept of video data to be registered as a content, and its scenario data and meta information. In FIG. 6, the contents #1, #2 and #3 are conceptually illustrated representing a content composition of video data owned by a user. The meta information #1 indicates that the content name is content #1, the ORG flag indicating original data is TRUE, and the content #1 consists of an elementary content from a start time C1:t0 (=0) to an end time C1:t3 (relative time). The contents #2, #3 have the similar configuration.

Next, an operation in editing a registered content to mash up a content will be described.

Figure 5:
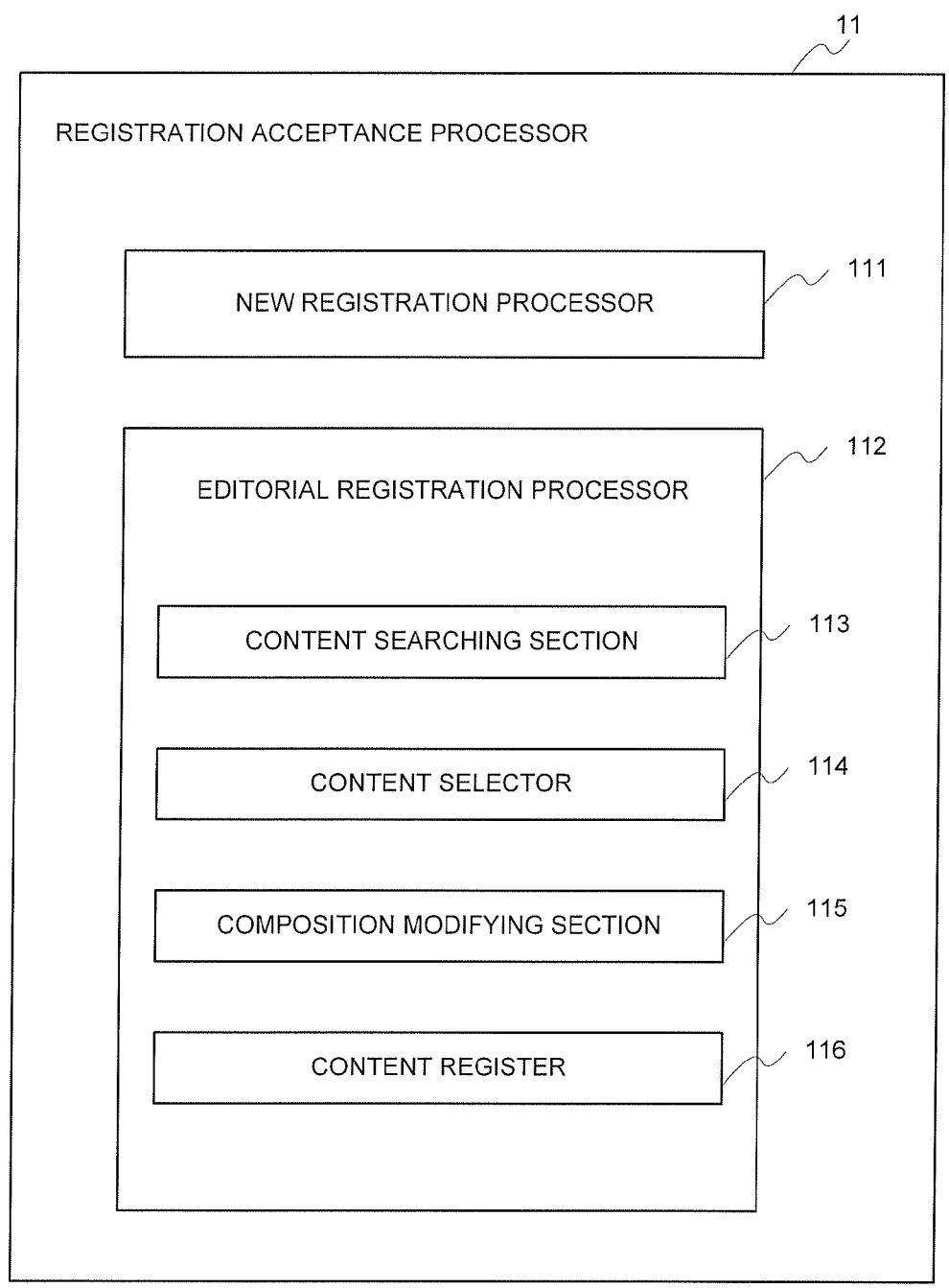
FIG. 5 is a block diagram showing a configuration of an editorial registration processor 112 in the content management server.

First, the user terminal 2 specifies an IP address, a URL or the like in the network, and connects to the registration acceptance processor 11 for editing, that is, to the editorial registration processor 112 shown in FIG. 5.

In response to the connection request by the user terminal 2, the editorial registration processor 112 transmits an editorial registration viewport P201 shown in FIG. 10. The user terminal 2 displays the received editorial registration viewport P201 on the display 24. The user performs looking-up, editing and registering operations on a content by an operation via the operating unit 25 on the editorial registration viewport.

Referring to FIG. 10, a user operation on the editorial registration viewport P201 in the user terminal 2 will be described. First, the content looking-up section P205 allows the user to search contents and view a list thereof, and once the user has input a content name in a content name search field and pressed a SEARCH button, a content recorded in the content recording means is retrieved. The retrieved content is displayed on the content looking-up section P205 (content search step). Moreover, a content recorded in a general material server 3 connected in the network N may also be specified directly by its URL or the like.

Upon selection of a content name displayed in the content looking-up section P205, the content is played on a video play viewport in the editorial operating unit P202 (content reproducing and outputting step). At that time, replay, stop, fast forward, and rewind of a content are enabled via an operation on the video operating button P207.

Once the user has selectively specified a portion that the user wants to use in this designated content by the start-point button P208 and end-point button P209 during play of the content and has pressed the add button P210, the selected content is added to the content composing section P204 (content selecting step), and composition information on the mashed-up content, which information consists of a combination of the content name, and start and stop times as a relative time from the content's start point of the selected video, is generated and displayed.

By repeating the operation at the editorial operating unit P202, it is possible to combine a plurality of contents. After the editorial operation is completed, the content name P211 to be registered is input at the content register P203 and the ENTER button P212 is pressed, whereupon the content is transmitted to the content management server 1 and registered as an edited content. When composition information on a content is to be modified, such modification on a content is enabled by inputting a predefined composition modifying command on the content composing section P204, for example, by dragging and dropping the content name display to change the order, or inputting a deleting command on the content name to remove the content from the composition information (composition modifying step).

The content #4 in FIG. 7 and content #5 in FIG. 8 show examples of creation of a new content by editing already-registered contents. The content #4 is a content created by combining the content #3 from the time t1 to t3, the content #1 from t0 to t1, the content #2 from t1 to t2, and the content #1 from t2 to t3. The content #5 is a content created by combining the content #4 from t1 to t4, and the content #2 from t3 to t4. FIG. 11 is a conceptual diagram displayed in the content composing section P204 on the editorial registration viewport shown in FIG. 10 in editorial registration of the contents #4 and #5.

Subsequently, triggered by the press of the ENTER button P212, the editorial registration processor 112, which is in the registration acceptance processor 11 in the content management server 1, accepts the composition information in the content composing section P204 representing details of editing (Step S1, content accepting step), analyzes the content, and generates scenario data (Step S2, content analyzing step). The scenario data #4 and #5 in FIGS. 7 and 8 are scenario data for the contents #4 and #5, respectively.

Based on such scenario data, the meta information generation processor 13 generates meta information for the content (meta information generating step). Now an operation of generating meta information at the meta information generation processor 13 will be described in more detail hereinbelow.

First, the meta information generation processor 13 receives scenario data from the content analysis processor 12 (Step S3). The meta information generation processor 13 refers to the time and content name from the scenario data #4 (Step S4, component content identifying step).

The presence of the content name in the scenario data is checked (Step S5), and if the content name is present (YES at Step S5), the content name is specified to read meta information for the corresponding content name from the content information storage 17 (meta information reading step), and ORG flag information in the meta information is referred to (Step S6).

Next, decision processing is performed on the ORG flag information (Step S7), and if the ORG flag is TRUE, which indicates that the corresponding content contains unitary data, the content list in the meta information is assigned with the corresponding content name (Step S8, content composition information generating step). Moreover, the end time for the corresponding content is assigned with an edited point (editorial information), so that the information is assigned with the corresponding content name plus end time (Step S9).

If, in the ORG flag decision processing (Step S7), the ORG flag is FALSE (NO at Step S7), the content list in the meta information for the corresponding content is referred to (Step S10). The times of the content list in the meta information that match the time from the start time to the end time of the content designated in the scenario data are calculated, and the content name in the meta information is registered in the meta information to be generated (Step S11). Moreover, an edited point from the start time to the end time specified in the scenario data is registered as an edited point in the meta information to be generated (Step S12).

It should be noted that the meta information #4 and #5 in FIGS. 7 and 8 are meta information for the contents #4 and #5, respectively. The meta information #4 indicates that the content #4 is made up with the contents #3, #1, #2, and #1, and these contents that are referred to all have an ORG flag of TRUE indicating that each content refers to its video data itself, and therefore, its content list is registered with their respective content names and start and end times, and the registered edited point is represented by the time of the content #4.

The meta information #5 indicates that the content #5 is made up with the contents #4 and #2, and the meta information #4 for the content #4 has an ORG flag of FALSE indicating that the content #4 is an editorial content, and therefore, corresponding times are calculated from the start and end times in the content #4 that the content #5 refers to and the content list of the meta information #4 in the corresponding time portion is registered. Moreover, its edited points are registered as those of the content #4 at C5:t1 and C5:t2 that correspond to the time in which the content #4 is referred to, while C5:t3 is registered as an edited point of the content #5.

The thus-produced meta information is recorded as content information in the content information storage 17 in the content management server 1 (Step S13, content registering step, after NO at Step S5).

Next, an operation in watching a content will be described. The user terminal 2 specifies an IP address or a URL in the network N, and connects to the content management server 1. In response to the connection request by the user terminal 2, the content distribution processor 15 in the content management server 1 transmits a content list. The user terminal 2 displays the content list on the display 24. FIG. 12 shows a conceptual diagram of the content list displayed on the display 24 in the user terminal 2.

Thereafter, once the user has selected a content that he/she wants to watch in the content list, the content distribution processor 15 in the content management server 1 reads meta information of the corresponding content from the content information storage 17, and performs distribution of the content according to the content list in the meta information. Specifically, corresponding portions of corresponding contents are distributed in a sequence in the content list in a streaming scheme. For example, video data stored in the video data storage 16 in the content management server 1 that is referred to is read from that storage device 1C and distributed to the user terminal 2 in a streaming scheme; and video data stored in another computer in the network N, such as the material server 3, is distributed to the user terminal 2 in a streaming scheme by commanding the computer for distribution.

The user terminal 2 receives the distributed streaming data, and plays it at the display 24. FIG. 13 is a conceptual diagram of a content play viewport displayed on the display 24 in the user terminal 2. The user is allowed to perform replay, stop, fast forward, and rewind processing in the content play viewport.

According the present embodiment as described above, when a content for which meta information has been generated is incorporated in another content to make up a mashed-up content, the meta information on the component content can be referred to facilitate production and registration of composition information for the mashed-up content to be newly registered. Especially, since a content list in the meta information representing the composition of the mashed-up content is configured to refer to video data itself, the need of duplicate storage of a large size of data such as video is eliminated, thus reducing the storage size of the system; and since reference to original data in playing a content is not complicated, lag in play can be prevented.

Exemplary Embodiment 2

Figure 15:
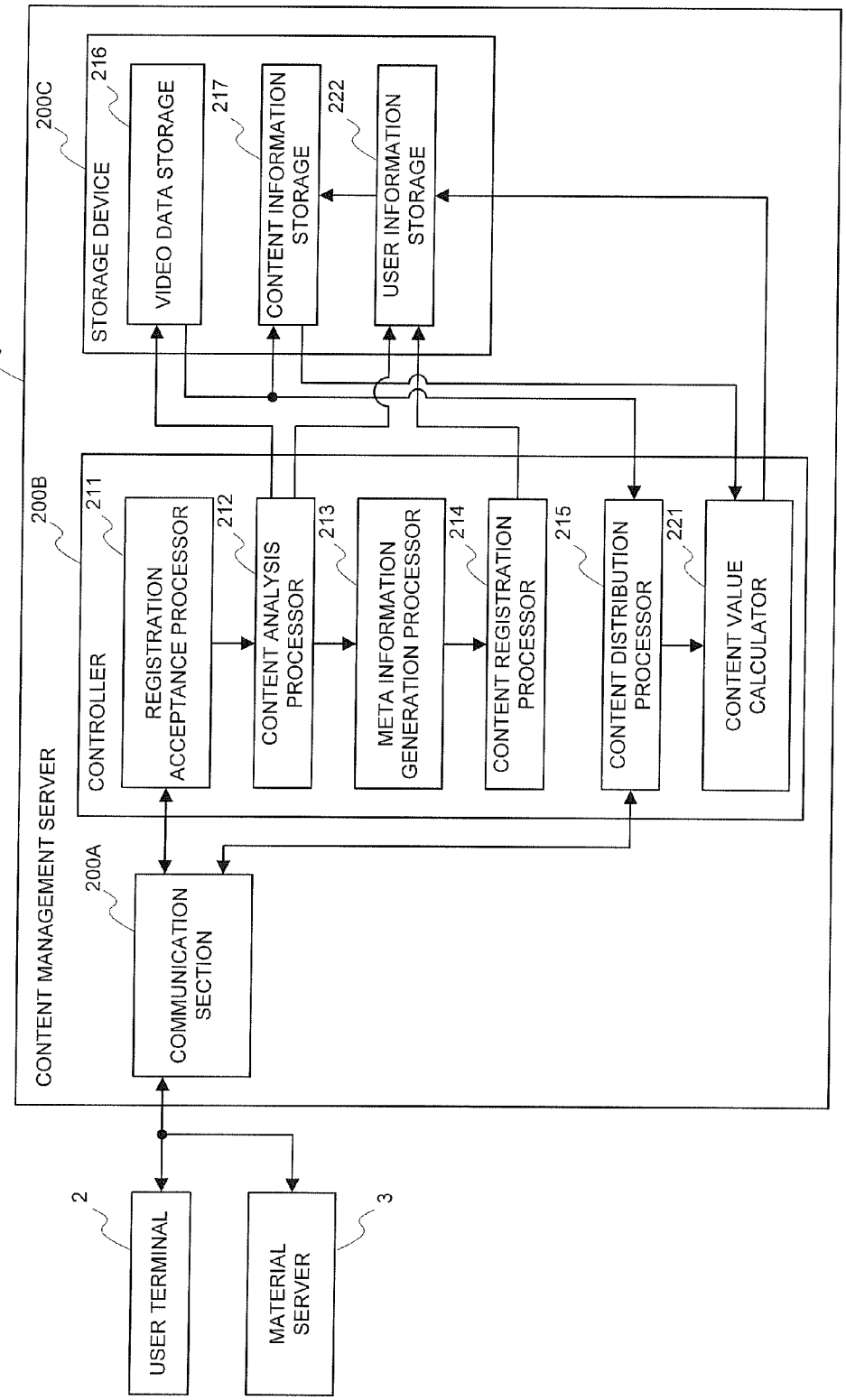
FIG. 15 is a block diagram showing a configuration of a content management server in Embodiment 2.
Figure 16:
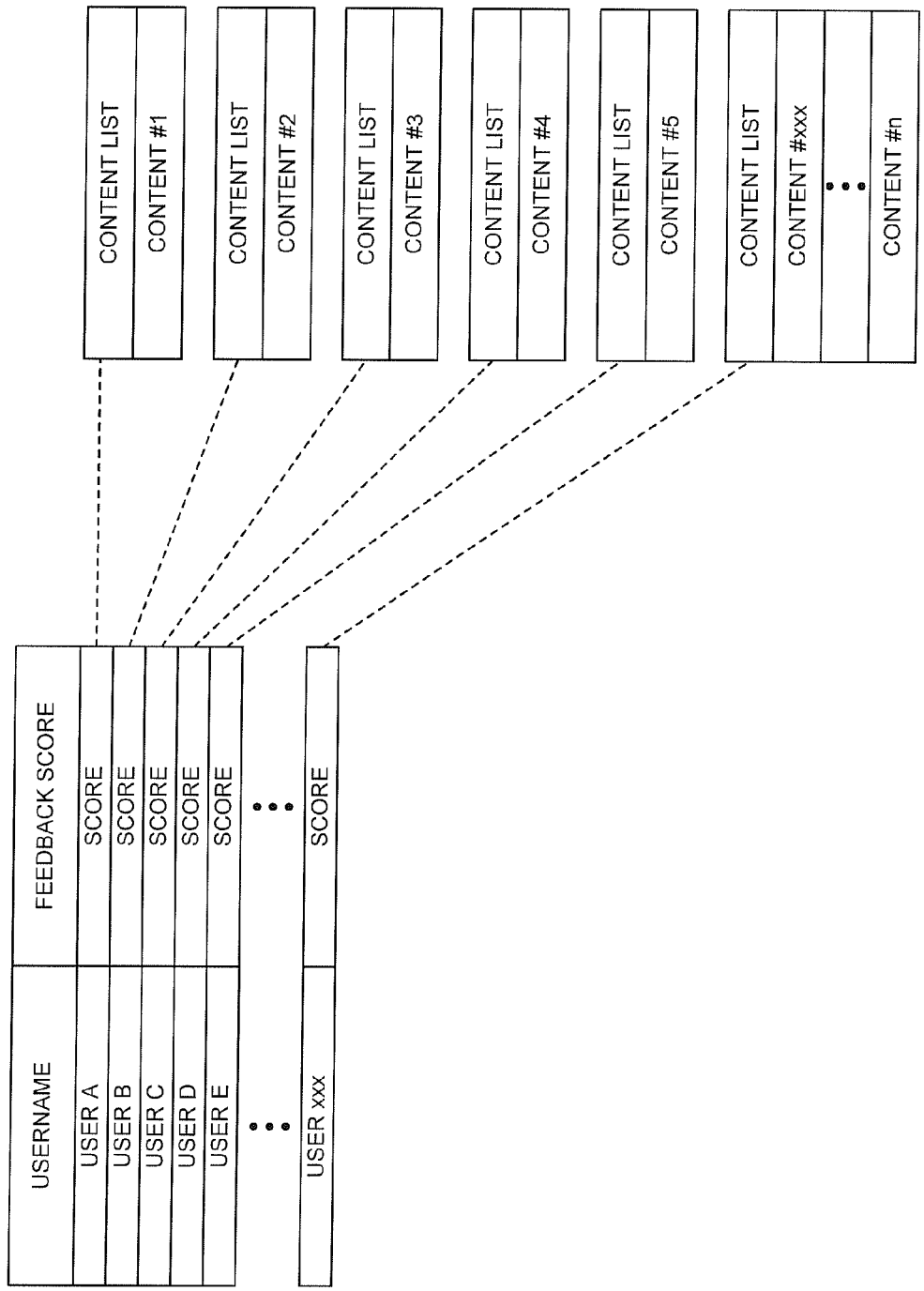
FIG. 16 shows an example of information stored in a user information storage in Embodiment 2.
Figure 17:
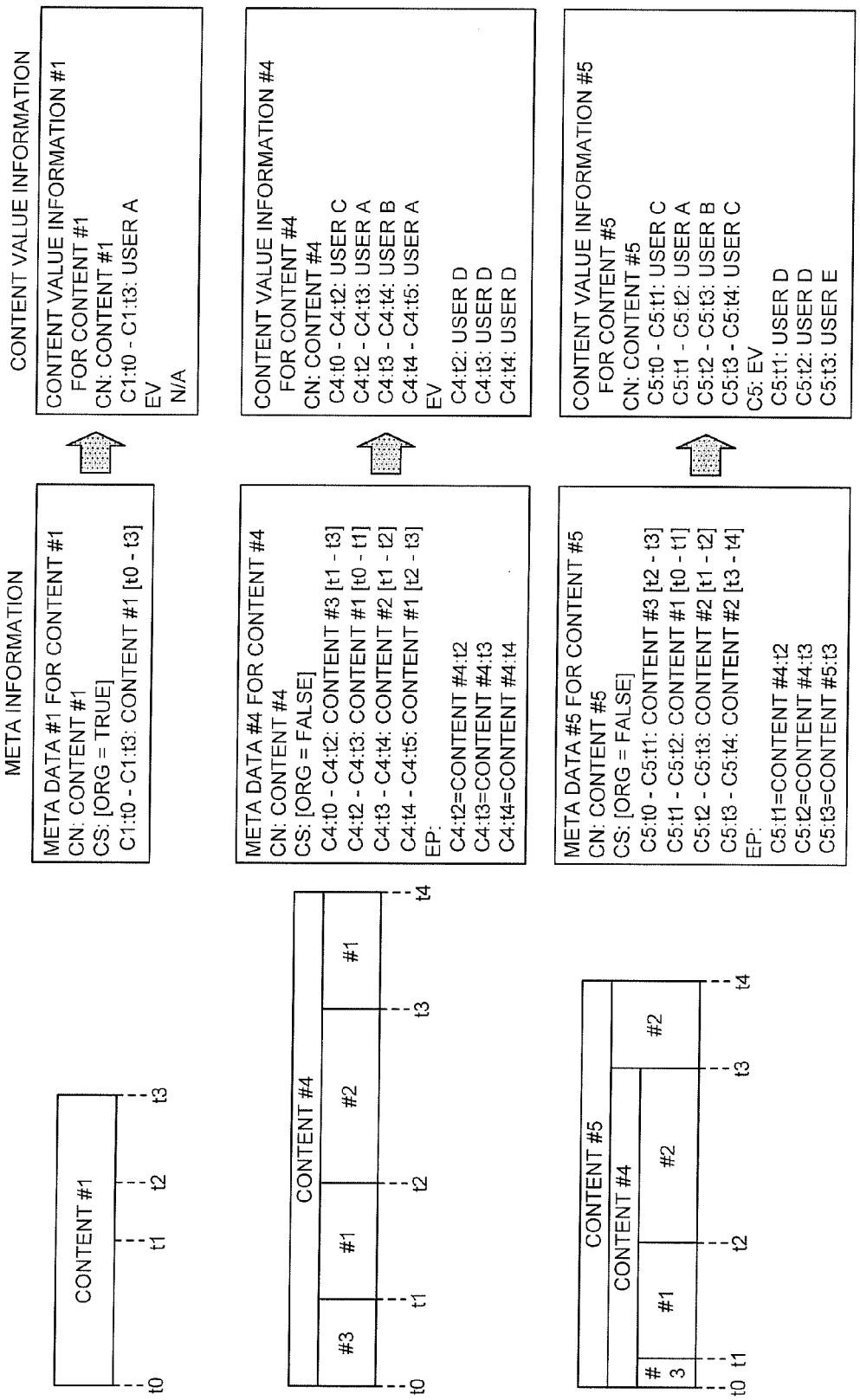
FIG. 17 shows an example of meta information and content value information for a content.
Figure 18:
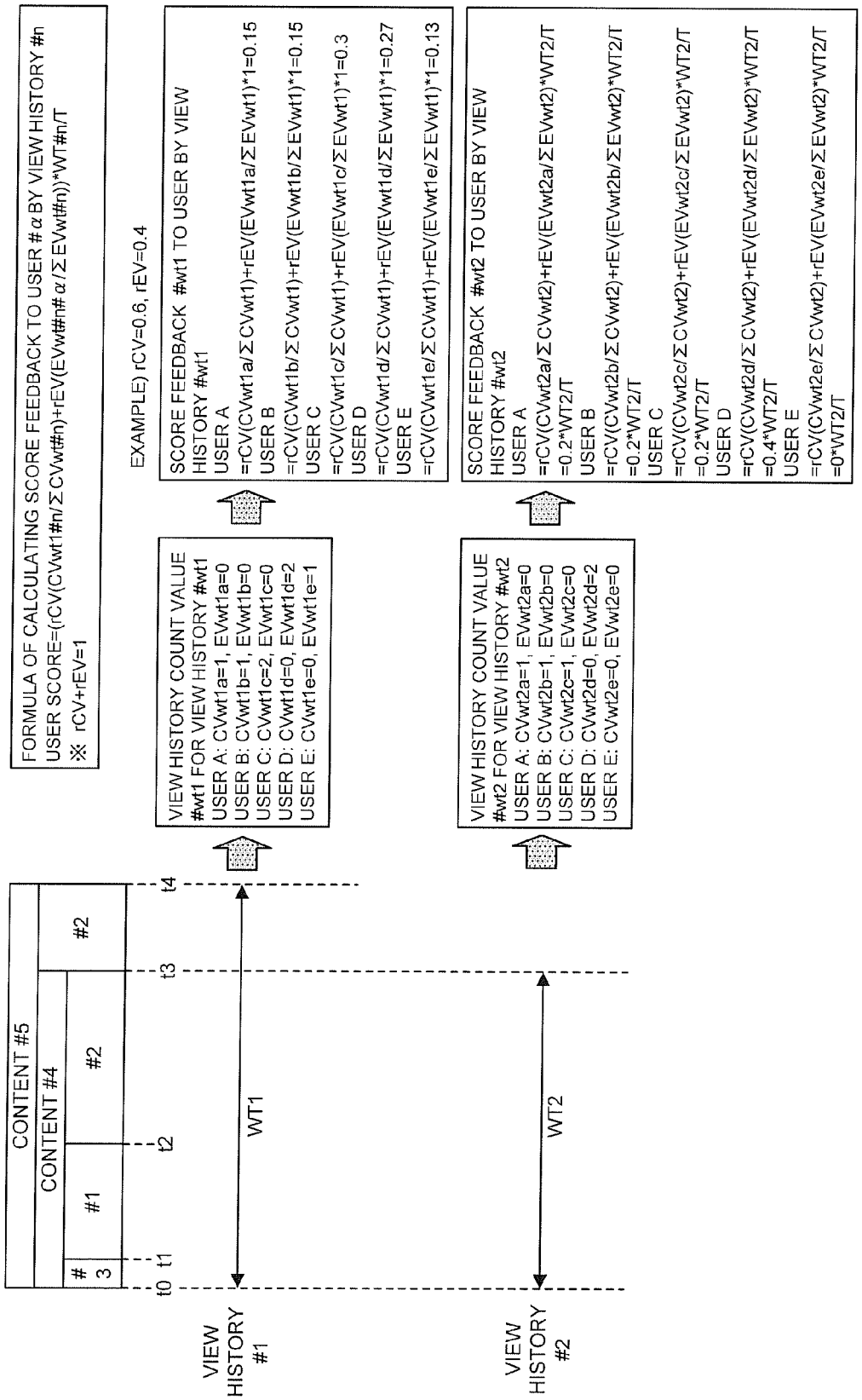
FIG. 18 shows an example of a view history for a content and calculation of score feedback.

Next, a second embodiment of the present invention will be described with reference to FIGS. 15-20. FIG. 15 is a functional block diagram showing a configuration of a content management server in the present embodiment, and FIGS. 16-18 are diagrams showing exemplary information stored in the content management server. FIGS. 19-20 are flow charts showing part of the operation of the content management server.

[Configuration]

First, a content management server 200 in the present embodiment employs a generally similar configuration to that of the content management server 1 described regarding the first embodiment. That is, as shown in FIG. 15, a communication section 200A, a controller 200B in which several kinds of processors 211-215 are built, and a storage device 200C in which storages 216, 217 are formed are provided.

Moreover, in this embodiment, the controller 200B is embedded with a given program to thereby constitute a content value calculator 221, and the storage device 200C is provided with a user information storage 222. Furthermore, the processors 211-215 similar to those in the Embodiment 1, as well as the storages 216, 217 are provided with a new function, which will be described below.

First, upon detection of a content registration request by the user terminal 2, the registration acceptance processor 211 in the present embodiment stores user information (content creator information) as shown in FIG. 16 in a user information storage 222 (creator information storing means) in the storage device 220C.

The user information is registered such that a username is associated with a score to be fed back to the user and the name of a content that the user has created/edited. The score as used herein refers to points representing the value of a content created by a user, which will be discussed later.

The meta information generation processor 213 in the present embodiment has a function of generating the meta information as described above, and in addition, generating value information for creation of a content (value information generating means). For example, as indicated by content value information shown in FIG. 17, based on the meta information generated according to the result of analysis by the content analysis processor 212 as described above, and on the user information stored in the aforementioned user information storage 222 (see FIG. 16), which user the value of a content is attributed to is determined and registered. In particular, there are provided a function (productive value placing means) of producing a content value (CV: content productive value information) representing the value for production of a content for each content included in the content list, and a function (editorial value placing means) of producing an editorial value (EV: content editorial value information) representing the value for mashing-up for each mashed-up content. The content value (CV) consists of information in which a relative time of the content is combined with the name of a user who owns the content value at that time, and the editorial value (EV) consists of information in which the time of an edited point is combined with the name of a user who is an editor at that point, as shown in FIG. 17.

Now an example of production of the content value information will be described with reference to FIG. 17.

First, when a user A registers video data having a data length of C1*t*3 hours as a content #1, the meta information #1 generated as described above is referred to and ORG flag is found to be TRUE; thus, a video value from the start time C1:t0 to C1:t3 of the content is registered as a video value attributed to the user A.

With regard to content value information #4 for the content #4, the content name is referred to from the meta information #4, and user information for the corresponding contents are referred to from the user information in the user information storage 222; and thus, the usernames for the contents, i.e., user A, user B and user C, are registered in CV, and user D, who is an editor of the content #4, is registered in EV.

With regard to the content value information #5 for the content #5, since the content #5 uses the content #4, user C, user B and user A of the content #3, content #2 and content #1 used in the content #4 are registered in CV. In EV, since the edited point for the content #4 is included, C5:t1 and C5:t2 are registered for user D, and C5:t3 is registered for user E because it is the edited point of the content #5. In generating EV, an edited point that is editorial information included in the aforementioned meta information is referred to.

The content value calculator 221 in the present embodiment has a function of calculating the numeric value of the value information (feedback point) based on the content value information for each content produced and registered as described above. Specifically, the content value calculator 221 operates in cooperation with the aforementioned meta information generation processor 213 to function as value information generating means. Now an example of calculation of a feedback point will be described with reference to FIG. 18.

In the present embodiment, a feedback point is calculated according to the watching status of a content. First, the content distribution processor 215 in this embodiment sends a watching status for a content at the user terminal 2, for example, view history information that contains a watched range represented by the start and end times of watching for each content, to the content value calculator 221.

The content value calculator 221 then reads content value information for the corresponding content from the content information storage 217 based on the received watching information.

Then, the time of watching in the view history information is compared with the content value information, and a score for a user who owns the value of the corresponding content is calculated.

The content value (CV) for a owner of video data and the editorial value (EV) created by an editor, multiplied by an arbitrary factor, are summed up as scores, which are registered in the user information storage 222 for a score feedback to the user.

Since the value is thus calculated based on the time of watching in the view history information, the score is fed back only for a portion of a content that is actually distributed and watched.

FIG. 18 shows an example of a view history count value and a result of calculation of a score feedback, wherein the view history count value is summed up by checking a view history of the content #5 to decide which content is watched within a watched range obtained from the view history.

FIG. 18 exemplarily shows two watch events represented by a view history #1 and a view history #2 for the content #5. Referring to the view history #1 and view history #2, as well as content value information #5, when the content is watched within a time specified by CV in the content value information #5, a score for the corresponding user is added. Next, when the content is watched within a time specified by EV, a score for the corresponding user is added. The addition results in a view history count value #wt1 and a view history count value #2.

These count values are multiplied by a content value coefficient rCV and an editorial value coefficient rEV, and by a ratio of watching time to the time of the content as well to calculate a score feedback for each user. For example, results when rCV=0.6 and rEV=0.4 are shown in FIG. 18 in the score feedback value #wt1 in the view history #1 and score feedback value #wt2.

The score feedback value calculated as described above is returned to users such that they can use the score as, for example, points for buying articles in a predetermined shop (such as an on-line shop).

[Operation]

Next, an operation of the content registration system having the aforementioned configuration, mainly, that of the content management server 220 will be described with reference to flow charts in FIGS. 14, 19 and 20, and other drawings. Since the operation up to registration of meta information is generally similar to that in Embodiment 1 described above, merely simple explanation thereof will be made.

First, the user terminal 2 specifies an IP address or a URL in the network N, and connects to the content management server 200; in response to the connection request by the user terminal 2, the registration acceptance processor 211 in the content management server 200 transmits a video registration processing viewport P101.

The user terminal 2 displays the received video registration processing viewport P101 on the display 24 to input a username, a name of a content to be registered, and a file specification for video data to be registered on the video registration processing viewport P101; upon a press of the ENTER button P105, these data are transmitted to the content management server 200.

The registration acceptance processor 211 in the content management server 200 accepts the information (Step S1, content accepting step), and the received information is analyzed at the content analysis processor 212 to generate scenario data (Step S2, content analyzing step), which is recorded with the associated video data and content name in the video data storage 216. The content analysis processor 212 also passes the scenario data to the meta information generation processor 13. At that time, the content analysis processor 212 associates the content name with the username to generate user information shown in FIG. 16, and records them in the user information storage 222.

Subsequently, the meta information generation processor 213 generates meta information and value information based on the scenario data (Steps S3, S4, meta information generating step, value information generating step), and records them in the content information storage 217 (Step S13, content registering step, after NO at Step S5).

Taking an exemplary case in which value information for the content #1 is generated, for example, as shown in FIG. 17, the generated meta information #1 is first referred to (Step S201). Since ORG flag=TRUE, a user for the content #1 itself included in the content list is determined with reference to the user information (Step S202). Thus, the content value (CV) from the start time C1:t0 to C1:t3 in the content is registered as being attributed to the user A (Step S203, productive value placing step). Since the content #1 is a unitary content, no editorial value (EV) is placed.

Next, an operation in editing a registered content to mash up a content such as the content #4 or #5 will be described.

First, the user terminal 2 specifies an IP address, a URL or the like in the network, and connects to the registration acceptance processor 211 for editing in the content management server 200. In response to the connection request by the user terminal 2, the content management server 200 transmits an editorial registration viewport P201. The user terminal 2 then displays the received editorial registration viewport P201 on the display 24, and looking-up, editing and registering operations are performed on the content on the editorial registration viewport, as described above. Upon completion of the editorial operation, the content is transmitted to the content management server 200.

The content management server 200 accepts details of editing of the content (Step S1, content accepting step), and analyzes the content to generate scenario data (Step S2, content analyzing step). The meta information generation processor 213 then generates meta information for the content based on the scenario data (meta information generating step), and generates content value information from the generated meta information (value information generating step).

Now an operation of generating content value information will be described in detail. After generating the meta information, the meta information generation processor 213 refers to the content name in the meta information (Step S201). It also refers to the username in the user information storage 222 using as a key the content name that is referred to (Step S202). It then registers the corresponding username according to the time in the content's meta information (Step S203). For example, as shown in FIG. 17, the content value information #4 is generated by referring to the content name in the meta information #4, and referring to user information for the corresponding content. The usernames of the contents, i.e., user A, user B and user C, are registered for CV (productive value placing step), and user D who is an editor of the content #4 is registered for EV (editorial value placing step).

The content value information #5 is generated from the content #5. Since the content #5 uses the content #4, user C, user B and user A of the content #3, content #2 and content #1 used in the content #4 are registered for CV. For EV, since the edited point of the content #4 is included, C5:t1 and C5:t2 are registered for user D, and C5:t3 is registered for user E because it is the edited point of the content #5. It should be noted that the order of registration of the productive value and editorial value is arbitrary.

The thus-produced content value information is recorded along with the meta information in the content information storage 217 in the content management server 200 (Step S13, content registering step, after NO at Step S5). It should be noted that production and registration of the content value information may be performed at any time once the meta information has been registered in the content information storage 217.

Next, an operation in watching a content will be described. As in Embodiment 1, once the user terminal 2 has connected to the content management server 200 and the user has selected a content that he/she wants to watch, the content distribution processor 215 reads meta information for the corresponding content from the content information storage 217, and performs distribution of a content according to a content list in the meta information. The content distribution processor 215 then stores a view history representing the distribution status of the distributed content in the content information storage 217. Alternatively, the status is sent to the content value calculator 221. Here, description will be made with reference to an example in which the content #5 is fully watched (view history #1), and an example in which it is watched up to a time t3 (view history #2), as shown in FIG. 18.

Upon receipt of the watching information from the content distribution processor 215 (Step S301), the content value calculator 221 refers to content value information for the corresponding content in the content information storage 217 (Step S302). It then compares the time of watching in the view history information and content value information to calculate a score value for a user who owns the value of the corresponding content. Specifically, the content value (CV) for a owner of video data and the editorial value (EV) created by an editor, multiplied by arbitrary factors, are summed up as scores, which are registered for a score feedback to the user (Step S303, productive value placing step, editorial value placing step).

In particular, the view history #1 and view history #2, as well as the content value information #5 are referred to as shown in FIG. 18, and a score for the corresponding user is added when the content is watched within a time specified by CV in the content value information #5. Next, when the content is watched within a time specified by EV, a score for the corresponding user is added. The addition results in a view history count value #wt1 and a view history count value #2. These count values are multiplied by a content value coefficient rCV and an editorial value coefficient rEV, and by a ratio of the watching time to the time of content as well to calculate a score feedback for each user. For example, results when rCV=0.6 and rEV=0.4 are shown in FIG. 5 in the score feedback value #wt1 in the view history #1 and score feedback value #wt2. The content value calculator 221 then adds and records the calculated score feedback value for each user to a user score in the user information storage 222.

At that time, the aforementioned registration acceptance processor 211 performs user authentication by comparison/decision on information that allows identification of a person, such as a username transmitted from the user terminal 2 in the connection request by the user terminal 2 with a username recorded in the user information storage 222. When content control such as updating or deletion of a content is to be performed, this user authentication permits access only to a content of a corresponding user recorded in the user information storage 222. Thus, updating control of a content by a user with no proprietary right (copyright) is prohibited. Moreover, in user authentication, there may be provided authentication by a password or encryption key, in addition to the username or user ID, that can be known by only the user himself/herself.

According to the present embodiment as described above, a productive value is placed on each content constituting a content for evaluation, and an editorial value is placed on a mashed-up content for evaluation. Therefore, the value of creating a content is returned to a user, the creative activity by users can be stimulated, and the frequency of usage of the system can be improved. Especially, a value fed back based on the result of watching, that is, a score, can be calculated to feed an appropriate value according to needs back to a creator.

The present invention is capable of registering contents such as videos by users, and has industrial applicability in that the present invention can be used in a system that is capable of distributing registered contents to users.

According to the present invention configured and operated as described above, since meta information including information representing the composition of a content as content information and information representing whether a content is a unitary content or a mashed-up content is registered, the composition of a content can be easily recognized by referring to such meta information, and processing such as playing of a content can be executed with a low load and at high speed. Moreover, by using the meta information, excellent effects that were not found in the prior art are provided, such as that production and registration of composition information for a mashed-up content are facilitated, and lag in playing such a content can be similarly reduced, thus improving convenience to users.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing apparatus in which a content is registered, comprising:
    a content accepting section for accepting content identification information for identifying a content to be registered;
    a content analyzer for analyzing a composition of a content to be registered based on said content identification information;
    a meta information generator for generating meta information based on a result of said analysis, which includes content composition information representing a composition of a content to be registered, and mashed-up-or-not information representing whether said content to be registered is composed as a unitary content or a mashed-up content in which a plurality of contents are combined;
    a meta information register for storing and registering said meta information in a predetermined storage device as content information; and
    a value information generator for generating and storing numeric value information of said content to be registered and/or each content contained therein based on an analysis result of said content analyzer and/or said meta information.

2. An information processing apparatus according to claim 1, wherein said meta information generator comprises:
    a component content identifying unit for identifying a component content making up said content to be registered based on an analysis result of said content to be registered;
    a meta information reader for reading said meta information of said component content, which is already registered; and
    a content composition information generator for generating said content composition information of said content to be registered based on said read meta information on said component content, and said analysis result.

3. An information processing apparatus according to claim 2, wherein said content composition information generator generates said content composition information of said content to be registered based on said content composition information contained in said meta information of said component content in case that said mashed-up-or-not information contained in said meta information of said component content is information representing a mashed-up content.

4. An information processing apparatus according to claim 3, wherein said content composition information generator includes said content composition information contained in said meta information of said component content in said content composition information contained in said meta information of said content to be registered.

5. An information processing apparatus according to claim 4, wherein said content composition information is composed of a combination of unitary contents.

6. An information processing apparatus according to claim 5, wherein said content composition information is composed of information for identifying each unitary content, and information for designating a utilization part of each unitary content.

7. An information processing apparatus according to claim 1, comprising:
   a content distribution request accepting section for accepting a distribution request for a content; and
   a content distributing section for reading said already registered meta information of a content that is requested for distribution, and performing content distribution processing based on said content composition information contained in said meta information.

8. An information processing apparatus according to claim 1, wherein the value information generator: (a) compares view history information for a content with corresponding content value information, (b) calculates a score for a user who owns the value of the corresponding content, (c) sums the content value for an owner of video data and an editorial value created by an editor, each multiplied by an arbitrary factor, and (d) registers the result as score feedback for the user.

9. An information processing apparatus according to claim 1, wherein said value information generator comprises:
   a productive value placing section for, for each content contained in said content to be registered, placing content productive value information representing a numeric value for production of said content; and
   an editorial value placing section for, in case that said content to be registered and/or said component content making up said content to be registered is said mashed-up content, placing content editorial value information representing a numeric value for mashing-up for said each mashed-up content.

10. An information processing apparatus according to claim 9, wherein said meta information generator detects an edited point of said content to be registered based on an analysis result of said content analyzer, and stores information of said edited point as editorial information of said content to be registered, and based on said editorial information contained in said meta information of said content to be registered, said editorial value placing section places said content editorial value information, and based on said content composition information contained in said meta information, said productive value placing section places said content productive value information.

11. An information processing apparatus according to claim 10, wherein, in case that said editorial information is contained in said already registered meta information of said component content making up said content to be registered, said editorial value placing section includes said editorial information in said editorial information of said meta information of said content to be registered.

12. An information processing apparatus according to claim 1, comprising a creator information storage for storing content creator information in advance, which identifies a creator of each content, and
   wherein, based on said content creator information, said value information generator provides said numeric value information placed for each content to a creator who created said each content.

13. An information processing apparatus according to claim 1, wherein said value information generator provides said numeric value information of a value in accordance with a distribution status of a content by said content distributing section.

14. An information processing apparatus according to claim 13, wherein said value information generator provides said numeric value information in accordance with a content part actually distributed by said content distributing section.

15. A non-transitory computer-readable recording medium in which a program is recorded, wherein said program causes an information processing apparatus in which a content is registered to execute:
   a content accepting step of accepting content identification information for identifying a content to be registered;
   a content analysis step of analyzing a composition of a content to be registered based on said content identification information;
   a meta information generation step of generating meta information based on a result of said analysis, which includes content composition information representing a composition of a content to be registered, and mashed-up-or-not information representing whether said content to be registered is composed as a unitary content or a mashed-up content in which a plurality of contents are combined; and
   a meta information registering step of storing and registering said meta information in a predetermined storage device as content information,
   wherein said program executes a value information generating step of generating and storing numeric value information of said content to be registered and/or each content contained therein based on an analysis result of said content analysis step and/or said meta information.

16. A non-transitory computer-readable recording medium in which a program is recorded according to claim 15, wherein said program causes said meta information generation step to execute:
   a component content identifying step of identifying a component content making up said content to be registered based on an analysis result of said content to be registered;
   a meta information reading step of reading said meta information of said component content, which is already registered; and
   a content composition information generating step of generating said content composition information of said content to be registered based on said read meta information on said component content, and said analysis result.

17. A non-transitory computer-readable recording medium in which a program is recorded according to claim 15, wherein said program causes said value information generating step to execute:
   a productive value placing step of, for each content contained in said content to be registered, placing content productive value information representing a numeric value for production of said content; and an editorial value placing step of, in case that said content to be registered and/or said component content making up said content to be registered is said mashed-up content, placing content editorial value information representing a numeric value for mashing-up for said each mashed-up content.

18. A non-transitory computer-readable recording medium in which a program is recorded according to claim 15, wherein the value information generating step further comprises: (a) comparing view history information for a content with corresponding content value information, (b) calculating a score for a user who owns the value of the corresponding content, (c) summing the content value for an owner of video data and an editorial value created by an editor, each multiplied by an arbitrary factor, and (d) registering the result as score feedback for the user.

19. A method of registering a content in an information processing apparatus, comprising:

a content accepting step of accepting content identification information for identifying a content to be registered;

a content analysis step of analyzing a composition of a content to be registered based on said content identification information;

a meta information generation step of generating meta information based on a result of said analysis, which includes content composition information representing a composition of a content to be registered, and mashed-up-or-not information representing whether said content to be registered is composed as a unitary content or a mashed-up content in which a plurality of contents are combined;

a meta information registering step of storing and registering said meta information in a predetermined storage device as content information; and after said meta information generation step, a value information generating step of generating and storing numeric value information of said content to be registered and/or each content contained therein based on an analysis result of said content analysis step and/or said meta information.

20. A method of registering a content according to claim 19, wherein said meta information generation step includes:

a component content identifying step of identifying a component content making up said content to be registered based on an analysis result of said content to be registered;

a meta information reading step of reading said meta information of said component content, which is already registered; and a content composition information generating step of generating said content composition information of said content to be registered based on said read meta information on said component content, and said analysis result.

21. A method of registering a content according to claim 19, wherein said value information generating step includes:

a productive value placing step of, for each content contained in said content to be registered, placing content productive value information representing a numeric value for production of said content; and an editorial value placing step of, in case that said content to be registered and/or said component content making up said content to be registered is said mashed-up content, placing content editorial value information representing a numeric value for mashing-up for said each mashed-up content.

22. A method of registering a content according to claim 19, wherein the value information generating step further comprises: (a) comparing view history information for a content with corresponding content value information, (b) calculating a score for a user who owns the value of the corresponding content, (c) summing the content value for an owner of video data and an editorial value created by an editor, each multiplied by an arbitrary factor, and (d) registering the result as score feedback for the user.

* * * * *